US009098731B1

(12) United States Patent
Amy et al.

(10) Patent No.: US 9,098,731 B1
(45) Date of Patent: Aug. 4, 2015

(54) OPTICAL POLLING PLATFORM METHODS, APPARATUSES AND MEDIA

(75) Inventors: Nolan R. Amy, Oakland, CA (US); Stan R. Amy, Portland, OR (US)

(73) Assignee: Plickers Inc., San Francisco, CA (US)

( * ) Notice: Subject to any disclaimer, the term of this patent is extended or adjusted under 35 U.S.C. 154(b) by 283 days.

(21) Appl. No.: 13/426,701

(22) Filed: Mar. 22, 2012

Related U.S. Application Data

(60) Provisional application No. 61/466,463, filed on Mar. 22, 2011.

(51) Int. Cl.
*G06K 9/00* (2006.01)

(52) U.S. Cl.
CPC ........................................ *G06K 9/00* (2013.01)

(58) Field of Classification Search
CPC ....................................................... G06K 9/00
USPC ......................................................... 382/103
See application file for complete search history.

(56) References Cited

U.S. PATENT DOCUMENTS

| | | | |
|---|---|---|---|
| 3,766,541 A | 10/1973 | Gordon et al. | |
| 3,947,669 A | 3/1976 | Simmons et al. | |
| 4,048,729 A * | 9/1977 | Derks ............................ | 434/320 |
| 5,210,604 A | 5/1993 | Carpenter | |
| 5,365,266 A | 11/1994 | Carpenter | |
| 5,465,384 A * | 11/1995 | Bejan et al. ................... | 455/2.01 |
| 5,612,524 A | 3/1997 | Sant'anselmo et al. | |
| 5,823,788 A | 10/1998 | Lemelson et al. | |
| 6,015,088 A * | 1/2000 | Parker et al. ............. | 235/462.01 |
| 6,950,534 B2 | 9/2005 | Cohen et al. | |
| 7,308,112 B2 | 12/2007 | Fujimura et al. | |
| 7,343,134 B1 | 3/2008 | Ward | |
| 7,555,766 B2 | 6/2009 | Kondo et al. | |
| 7,627,139 B2 | 12/2009 | Marks et al. | |
| 7,813,726 B2 | 10/2010 | Adkins | |
| 7,961,174 B1 | 6/2011 | Markovic et al. | |
| 2002/0115050 A1* | 8/2002 | Roschelle et al. ............. | 434/350 |
| 2004/0072136 A1* | 4/2004 | Roschelle et al. ............. | 434/350 |
| 2005/0197874 A1* | 9/2005 | Lehman ............................ | 705/7 |
| 2009/0037946 A1 | 2/2009 | Chang et al. | |
| 2009/0212113 A1* | 8/2009 | Chiu et al. ............... | 235/462.41 |
| 2010/0207874 A1 | 8/2010 | Yuxin et al. | |
| 2010/0304868 A1 | 12/2010 | Zalewski | |

FOREIGN PATENT DOCUMENTS

WO WO 2009148409 A1 * 12/2009

OTHER PUBLICATIONS

Hawkey, et al., From Cookies to Puppies to Athletes: Designing a Visual Audience Voting System (document states date of Apr. 24, 2004).
Wikipedia, Audience Response, http://en.wikipedia.org/wiki/Audience_response (webpage has last modified date of Feb. 27, 2012).

(Continued)

*Primary Examiner* — Stephen R Koziol
*Assistant Examiner* — Delomia Gilliard
(74) *Attorney, Agent, or Firm* — Aleksandr Gilshteyn; Lansing Lights LLC

(57) ABSTRACT

An image associated with a poll may be acquired via a camera. One or more symbols indicating responses may be found by analyzing the image. The responses specified by the symbols may be determined and saved. The responses may also be displayed to the operator and/or to the respondents.

20 Claims, 16 Drawing Sheets

EXEMPLARY OPP SYMBOLOGY

(56) References Cited

OTHER PUBLICATIONS

CHI 2004, Student Design Competition, http://www.sigchi.org/chi2004/cfp/student.html (webpage has last modified date of Apr. 14, 2004).

Kajal K. Lachhani, Crowd Computer Interaction at concerts and sports events, http://www.cs.auckland.ac.nz/courses/compsci705s2c/assignments/SeminarReports09/CrowdComputing_klac007.pdf (file has last modified date of May 11, 2009).

Schalleck, et al., Design of an Audience Voting System for the Olympic Games (document states date of Apr. 24, 2004).

Edublend, Motion Based Audience Response system—MARS, http://edublend.blogspot.com/2011/09/motion-based-audience-response-system.html (document states date of Sep. 2, 2011).

Heidari, et al., iPoll Audience Polling System on iPhone (document states date of Apr. 12, 2011).

Maynes-Aminzade, et al., Techniques for Interactive Audience Participation, http://www.monzy.org/audience/ICMI-2002-finalpub.pdf (website link states date of Oct. 14, 2002).

Maynes-Aminzade, et al., Techniques for Interactive Audience Participation, http://www.monzy.org/audience/ (downloaded Mar. 12, 2012).

Hai Techi, Pattern Recognition Application, http://tech.groups.yahoo.com/group/OpenCV/message/3416 (website states date of Jul. 6, 2001).

Pierre David Wellner, Interacting with paper on the DigitalDesk (document states date of Mar. 1994).

* cited by examiner

EXEMPLARY OPP USAGE SCENARIO

EXEMPLARY OPP SYMBOLOGY CONFIGURATION

310

315

320

325

EXEMPLARY OPP SYMBOLOGY

FIGURE 4
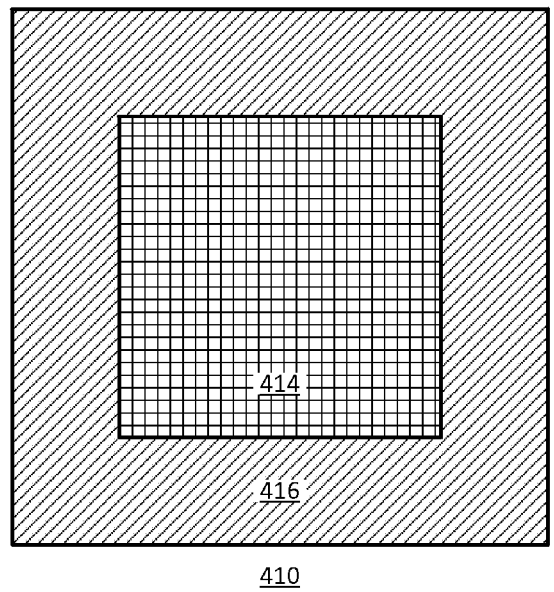
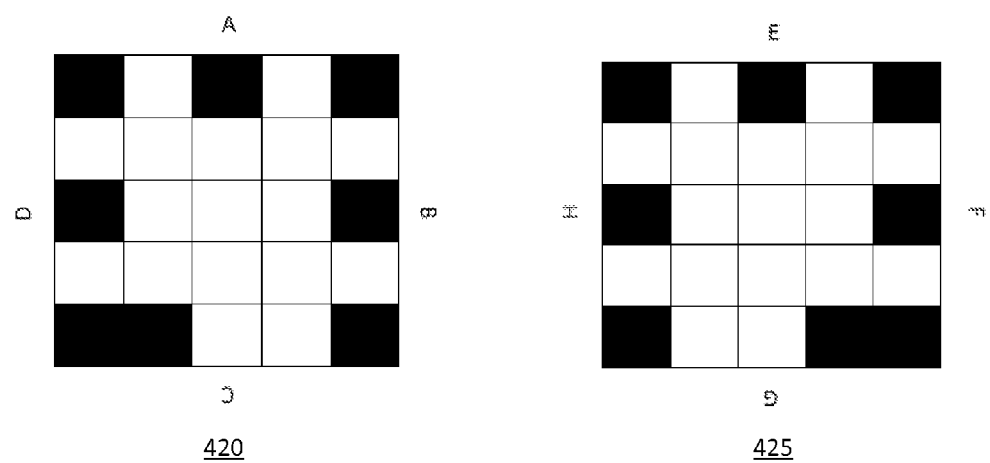
EXEMPLARY OPP SYMBOLOGY

EXEMPLARY OPP POLL ADMINISTERING (PA) COMPONENT

EXEMPLARY OPP POLL ADMINISTERING DATA FLOW

EXEMPLARY OPP IMAGE ANALYZING (IA) COMPONENT

EXEMPLARY OPP IMAGE ANALYZING (IA) COMPONENT

EXEMPLARY OPP HOLE FINDING (HF) COMPONENT

EXEMPLARY OPP HOLE VALIDATING (HV) COMPONENT

EXEMPLARY OPP SYMBOL LOCATING (SL) COMPONENT

EXEMPLARY OPP SYMBOL LOCATING (SL) COMPONENT

EXEMPLARY OPP SYMBOL DECODING (SD) COMPONENT

EXEMPLARY OPP SYMBOL DECODING (SD) COMPONENT

FIGURE 15
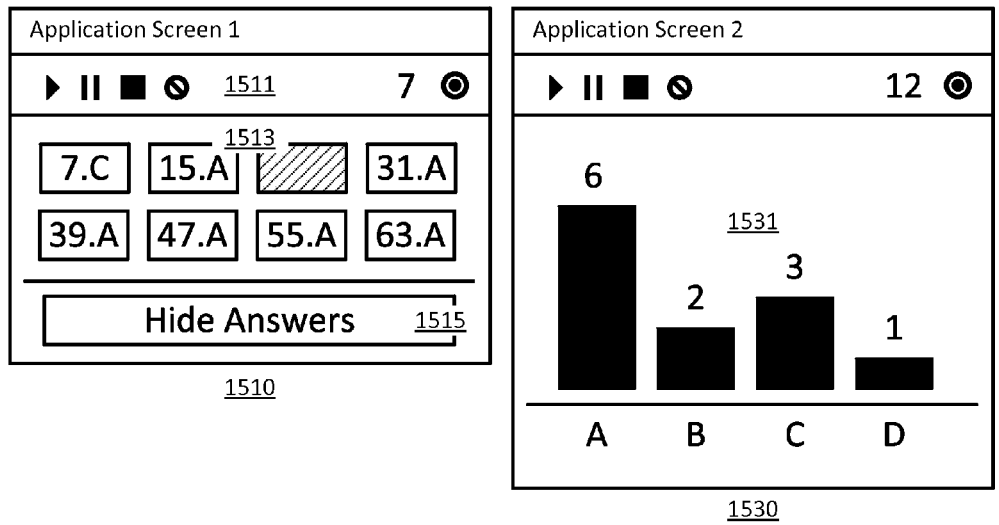
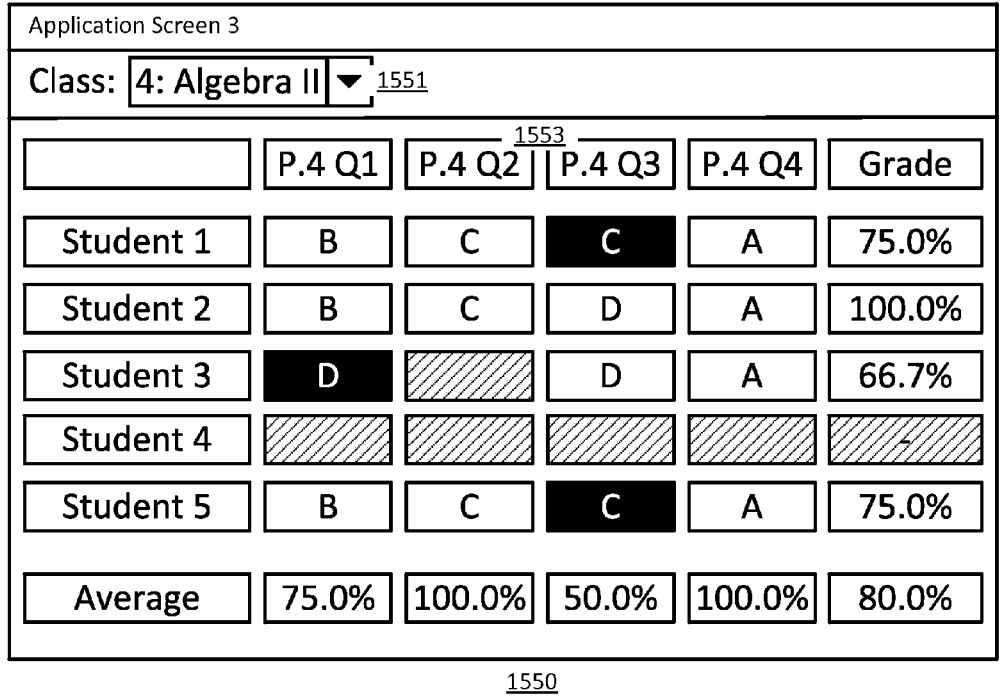
EXEMPLARY OPP APPLICATION SCREENS

OPTICAL POLLING PLATFORM METHODS, APPARATUSES AND MEDIA

This disclosure describes OPTICAL POLLING PLATFORM METHODS, APPARATUSES AND MEDIA (hereinafter "OPP"). A portion of the disclosure of this patent document contains material which is subject to copyright and/or mask work protection. The copyright and/or mask work owners have no objection to the facsimile reproduction by anyone of the patent document or the patent disclosure, as it appears in the Patent and Trademark Office patent file or records, but otherwise reserve all copyright and mask work rights whatsoever.

CROSS-REFERENCE TO RELATED APPLICATIONS

Applicant hereby claims priority under 35 U.S.C. §119 to U.S. provisional patent application No. 61/466,463, filed Mar. 22, 2011, entitled "Optical Audience Response System."

The entire contents of the aforementioned application are herein expressly incorporated by reference in their entirety.

FIELD

The present disclosure is directed generally to polling platforms.

BACKGROUND

Audience participation is common in a classroom setting. For example, teachers wishing to test students' understanding of the material may propose an answer to a posed question and ask those students who agree with the proposed answer to raise their hands. In another example, teachers may pose a question and cold call on individual students to provide an answer.

BRIEF DESCRIPTION OF THE FIGURES

The accompanying figures and/or appendices illustrate various exemplary embodiments in accordance with the present disclosure.

FIG. 4 shows a diagram illustrating exemplary symbology in another embodiment of the OPP.

FIG. 15 shows a screen shot diagram illustrating exemplary application screens in one embodiment of the OPP.

DETAILED DESCRIPTION

Introduction

The OPP introduces a new type of polling platform that, in various embodiments, may facilitate recording of data accurately and/or individually, keeping responses secret, statistical analysis of responses, and/or the like at a lower cost than traditional audience response/polling systems. In some embodiments, the OPP avoids the cost of having an electronic device for each audience member while nonetheless collecting responses electronically. For example, such embodiments may provide each audience member the ability to visually indicate his or her responses by analyzing images of the audience members and their visually indicated responses to identify their desired responses. In some embodiments, the OPP may be used for purposes other than conducting polls. For example, the OPP may be used as a game controller, as a general input device (e.g., to operate a machine), and/or the like.

Detailed Description of the OPP

Figure 1:
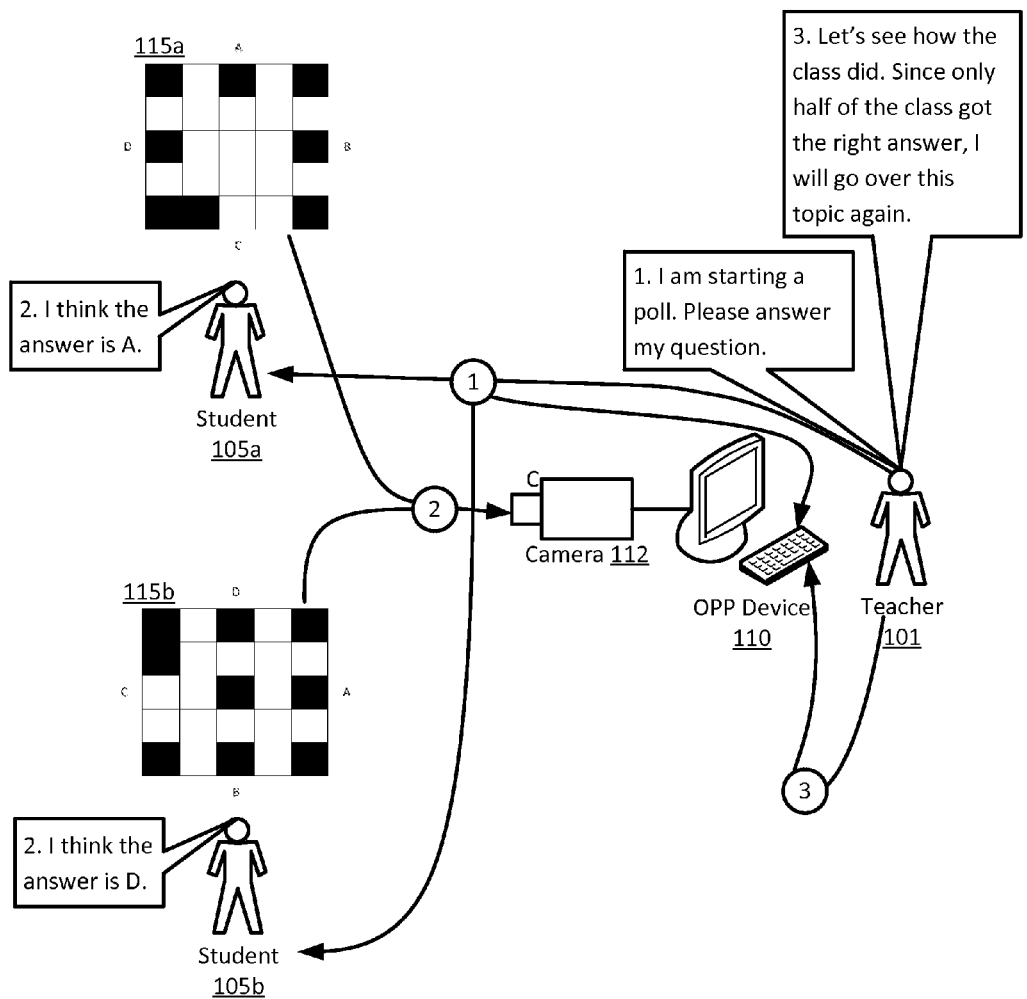
FIG. 1 shows an exemplary usage scenario in one embodiment of the OPP.

FIG. 1 shows an exemplary usage scenario in one embodiment of the OPP. In FIG. 1, a teacher 101 may wish to find out how well students in a class understood a topic by asking the students to respond to a question. The teacher may ask the question and may initiate a poll via an OPP Device 110.

The students 105*a-b* may indicate their answers using response devices 115*a-b* (e.g., by holding up a response device). In one embodiment, a response device may comprise a sheet of reinforced paper printed with computer-readable indicia (e.g., a two-dimensional black and white barcode symbology) that encodes the answer and/or ID of the student. For example, the answer may be determined by the orientation of a response device, while the student providing the answer may be determined by the color of the center square of the response device (e.g., student 105*a* may be identified by the white center square of the response device 115*a* and student 105*b* may be identified by the black center square of the response device 115*b*). In another embodiment, a response device may be any device capable of reflecting, transmitting, and/or emitting light and/or sound.

The OPP Device may use a peripheral device such as a digital camera 112 to obtain an image of the students holding up their response devices. The OPP Device may analyze the image to determine how each of the students answered the question. In one embodiment, the OPP Device may display results (e.g., the answer provided by each student and/or whether the answer is correct, statistics such as the percentage of correct responses) to the teacher. In another embodiment, the OPP Device may display results (e.g., whether a student's response has been recognized and/or whether the response is correct) to the students. Using results of the poll the teacher may determine whether the students in the class understood the topic, and, if not, the teacher may choose to go over the topic again.

Figure 2:
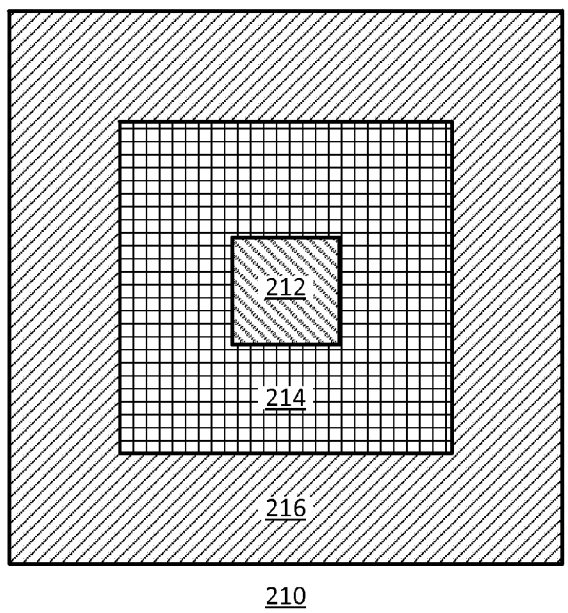
FIG. 2 shows a diagram illustrating exemplary symbology configuration in one embodiment of the OPP.

FIG. 2 shows a diagram illustrating exemplary symbology configuration in one embodiment of the OPP. In FIG. 2, at 210 regions of the symbology configuration are shown using different patterns. In this embodiment, portions of the symbology configuration may be referred to using three regions. The center region 212 may be referred to as the "hole." The region 214 surrounding the hole may be referred to as the "donut." The region 216 surrounding the donut may be referred to as the "ring."

As illustrated at 220, portions of the symbology configuration may also be referred to using twenty five cells (e.g., the symbology configuration may comprise 25 squares, 25 rectangles, and/or the like). In this embodiment, the hole comprises cell 25, the donut comprises cells 17 through 24, and the ring comprises cells 1 through 16.

Figure 3:
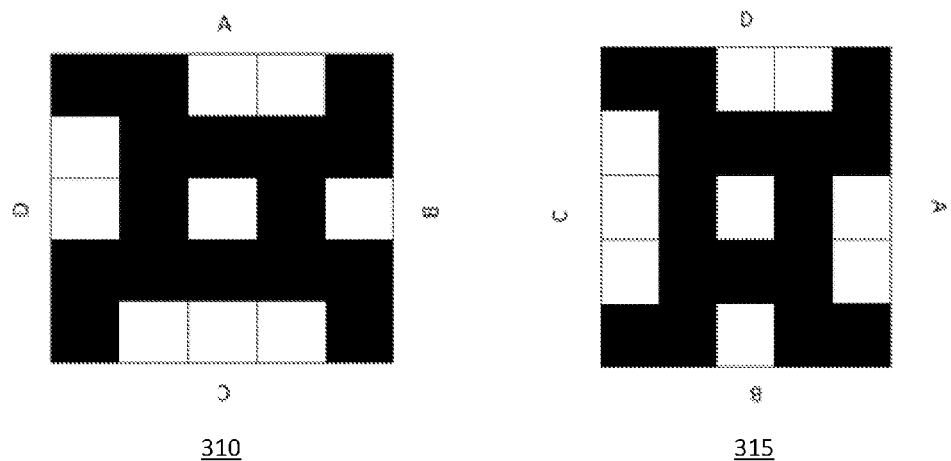
FIG. 3 shows a diagram illustrating exemplary symbology in one embodiment of the OPP.

FIG. 3 shows a diagram illustrating exemplary symbology in one embodiment of the OPP. For example, information regarding the symbology may be stored in the symbology data store 1630*b* (e.g., this information may be used to determine how to analyze an image to detect and/or decode a symbol (i.e., a response device implementing a symbology)). The symbology described in FIG. 3 corresponds to the symbology configuration described in FIG. 2. In FIG. 3, the symbology is based on a grid of cells (e.g., a 5 by 5 grid of square cells). In one embodiment, each cell may be either white or black. In one implementation, the hole may be white, the donut may be black, and the ring may be used to encode data using static and/or dynamic cells. In this implementation, and with reference to symbol 310, nine cells in the ring may be static—the four corner cells (cells 1, 5, 9, 13 as described in FIG. 2) may be black; the four orientation cells (i.e., the four cells in the ring that are just clockwise from the four corner cells—the orientation cells may be used by the OPP to determine the orientation of a symbol) may include three black cells (cells 2, 6, 14) and one white cell (cell 10); and one connector cell (cell 8—a connector cell may be used to ensure that each corner cell is connected to the donut by a black cell) may be black. The remaining seven cells in the ring in this implementation may be dynamic—six data cells (cells 3, 4, 7, 10, 12, 15, 16) may be used as data bits (e.g., a white cell is a 1 and a black cell is a 0) to provide sixty four unique values (e.g., used to identify students in a class); and one parity cell (cell 11) may be used to provide error detection (e.g., a parity bit) and/or correction for the data bits. In this implementation, a symbol may also include letters A, B, C, and D on the sides (e.g., to let a respondent know how to orient the symbol to provide an answer—the letter on the top, which is upright, is the answer associated with that orientation of the symbol).

Symbols 310, 315, 320 and 325 illustrate how two respondents (e.g., students) may use the symbology in this implementation to provide answers to a question while uniquely identifying themselves to the OPP. Symbols 310 and 315 are the same except for their orientation—symbol 310 is associated with an answer of A, while symbol 315 (flipped clockwise ninety degrees compared to symbol 310) is associated with a rotated answer of D. The orientation may be determined by the OPP using the four orientation cells (e.g., based on the location of the white orientation cell). Accordingly, a first respondent may hold his response device (e.g., a symbol) as in 310 to provide an answer of A, or as in 315 to provide an answer of D. The data cells may identify the first respondent to the OPP. For example, the ID of the first respondent based on symbol 310 is a binary number 111111, which is a decimal number 63. The parity cell may provide error detection and/or correction for the first ID. For example, since there is an even number of white data cells, the parity cell is white. Similarly, symbols 320 and 325 are the same except for their orientation—symbol 320 is associated with an answer of A, while symbol 325 (flipped clockwise ninety degrees compared to symbol 320) is associated with a rotated answer of D. Accordingly, a second respondent may hold his response device as in 320 to provide an answer of A, or as in 325 to provide an answer of D. The data cells may identify the second respondent to the OPP. For example, the ID of the second respondent based on symbol 320 is a binary number 111101, which is a decimal number 61. The parity cell may provide error detection and/or correction for the second ID. For example, since there is an odd number of white data cells, the parity cell is black.

In other embodiments, symbologies may include cells that have colors other than white and black, include cells that may be shaded using various patterns, may include cells with non-rectangular shapes, may provide space for respondents to write responses by hand, may include known 2-dimensional barcode formats such as QR-Code, DataMatrix, and/or the like, may use a different number and/or configuration of cells (e.g., 4 by 4, or 6 by 8 instead of 5 by 5), may include symbols (e.g., numbers, letters) inside and/or outside and/or independent of cells, may include a side indicator (e.g., the OPP may use a side indicator cell of a double sided symbol to determine which side of the symbol is being presented to facilitate the use of answer choices E, F, G, and H), and/or the like.

FIG. 4 shows a diagram illustrating exemplary symbology in another embodiment of the OPP. For example, information regarding the symbology may be stored in the symbology data store 1630*b* (e.g., this information may be used to determine how to analyze an image to detect and/or decode a symbol).

In FIG. 4, at 410, regions of an exemplary symbology configuration are shown using different patterns. In this embodiment, portions of the symbology configuration may be referred to using two regions. The center region 414 may be referred to as the "data cells." The region 416 surrounding the data cells may be referred to as the "border cells." Portions of the symbology configuration may also be referred to using twenty five cells (see FIG. 2, at 220). In this embodiment, the data cells comprise cells 17 through 25, and the border cells comprise cells 1 through 16.

The symbology described at 420, 425 corresponds to the symbology configuration described at 410. In FIG. 4, the symbology is based on a grid of cells (e.g., a 5 by 5 grid of square cells). In one embodiment, each cell may be either light-absorbing (e.g., black) or light-reflecting (e.g., white). In one implementation, the data cells may be either white or black, and the border cells may be static. In this implementation, and with reference to symbol 420, nine data cells (cells 17 through 25) may be used as data bits (e.g., a white cell is a 1 and a black cell is a 0) to provide five hundred and twelve unique values (e.g., used to identify participants in an auditorium); border cells 1, 3, 5, 7, 9, 12, 13 and 15 (as described in FIG. 2, at 220) may be black; and border cells 2, 4, 6, 8, 10, 11, 14 and 16 may be white. For example, the number of black and white border cells may be equal to facilitate finding an appropriate threshold value (e.g., calculated as the average pixel value of the border cells, which may give an approximation of 50 percent gray) that may be useful during locating and/or decoding of a symbol. For example, the shading of the border cells may be rotationally asymmetric to facilitate determining the orientation of a symbol (e.g., regardless of the contents of the data cells). In this implementation, at 420, a symbol may also include letters A, B, C, and D on the sides (e.g., to let a respondent know how to orient the symbol to provide an answer—the letter on the top, which is upright, is the answer associated with that orientation of the symbol). Furthermore, at 425, more selections could be attained by using a mirror-image of the symbol on the reverse side of the response device to offer additional response selections E, F, G, and H.

Figure 5:
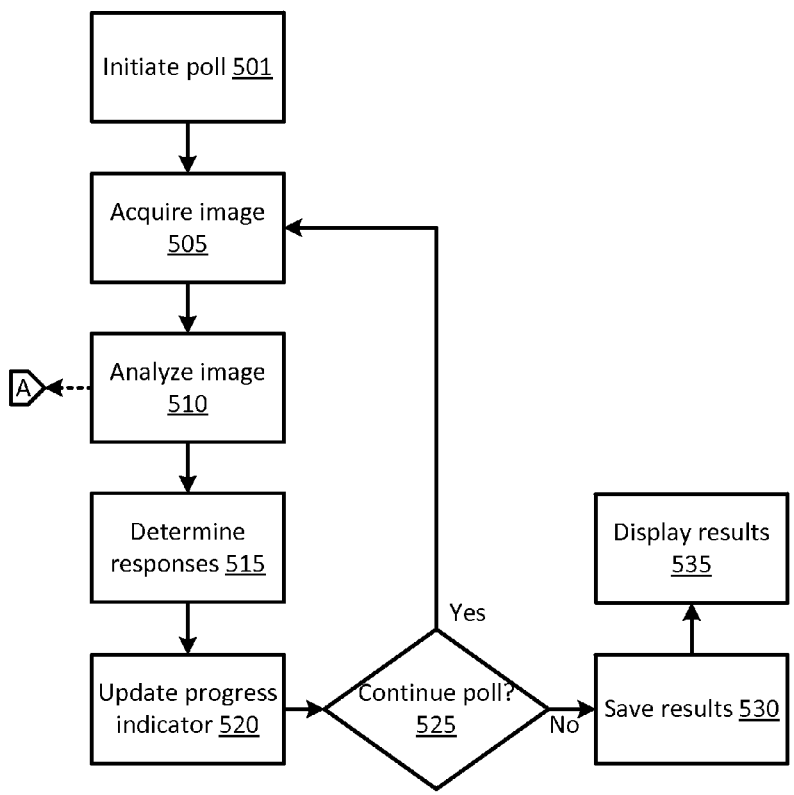
FIG. 5 shows a logic flow diagram illustrating an exemplary poll administering (PA) component in one embodiment of the OPP.

FIG. 5 shows a logic flow diagram illustrating an exemplary poll administering (PA) component in one embodiment of the OPP. In FIG. 5, a poll comprising one or more questions and/or input requests may be initiated at 501. In one embodiment, an operator may initiate the poll by inputting a command via an OPP device. As used in this disclosure, the term "operator" refers generally to users who may control (e.g., start and/or stop a poll, select which data should be displayed) the OPP such as a teacher, a presenter, a poll administrator, and/or the like. For example, the operator may use a mouse to press the "Start Poll" button of an OPP application running on the OPP device. In another embodiment, the poll may be initiated automatically by the OPP. For example, the poll may be initiated based on a timer. The questions that make up a poll may be stored in the questions data store 1630*c*. In one implementation, the operator (or another user who is responsible for creating polls) may select one or more questions for the poll using a user interface of the OPP application. For example, a teacher may select relevant questions using data such as question grade level (e.g., questions for 5th graders), question course (e.g., math), question standard (e.g., a state and/or federally assigned standard, such as those in the Common Core State Standards), question content (e.g., each question may have a symbol indicating subject matter—a triangle may indicate a geometry question), question topic (e.g., questions about angles in a triangle), question difficulty, question text, question images, videos, multimedia, and/or the like, question answer type (e.g., free response, true/false, multiple choice, answer text), and/or the like. In another example, a teacher may specify correct answers (e.g., one correct answer per question, multiple correct answers per question, a range answer, a set of correct selections, a correct location for a point, and/or the like) for the questions.

An image may be acquired at 505. For example, data regarding the image may be stored in the images data store 1630*e* using one or more SQL queries substantially in the following form:

INSERT INTO Images (ImageID, ImageContent)
      VALUES ("image identifier", "content of the image (e.g., data in the JPEG image format)")

In one embodiment, a camera (e.g., a webcam connected to the OPP device via a USB cable) may be used to acquire the image. The camera may be positioned such that respondents are mostly within the field of view of the camera. As used in this disclosure, the term "respondent" refers generally to users who may provide responses (e.g., answers to questions in a poll) to the OPP such as students, audience members, focus group members, and/or the like. In another embodiment, multiple cameras may be used to acquire the image (e.g., multiple images, a composite image, and/or the like). The cameras may be positioned such that respondents are mostly within the field of view of at least one of the cameras.

The acquired image may have responses (e.g., answers to questions) from one or more respondents to the poll. In one embodiment, to submit a response to the poll, a respondent may pick up his response device and may hold the response device so that it is facing the camera (e.g., substantially perpendicular to the line of sight from the camera to the center of the response device, a normal to the surface of the response device through the center of the response device should be pointed substantially at the camera, and/or the like). Before, during, or after holding up the device, the respondent may look at the letters printed on the sides (e.g., A, B, C, D with reference to FIG. 3), may select which response the respondent wants to submit, and may orient the response device accordingly. In other embodiments, techniques other than orientation of the response device may be used to specify a response. For example, a response device may be shown or hidden; a response device may be skewed with respect to the camera line of sight; a response device may be rotated in some combination of yaw, pitch, roll, and/or the like with respect to camera line of sight; a response device may be moved toward or away from the camera or in some other direction; a response device's position and/or orientation (e.g., pose) with respect to the camera and/or other objects may be altered; a response device may be flipped to one of the sides (e.g., front or back); a response device may be selected from multiple response devices, a response device may be modified (e.g., flip, slide, rotate, and/or the like a portion of the response device); a response device may be written on; a response device may be positioned in some way (e.g., relative to the respondent's body, relative to room and/or objects, toward or away from the camera); a response device may emit light; a response device may change color; and/or the like. It is to be understood that depending on implementation and/or poll, respondents may use multiple response device input types and/or multiple response devices during a session. For example, a respondent may choose a response device among a set of devices, may use a response device with multiple response device input mechanisms (e.g., a multiple choice answer on one side and a fill-in answer on the other side), and/or the like. In another example, the respondent may use a first response device to select the input type of the second response device to be used for the following question. In various implementations, the choice of the response device input types and/or response devices may depend on the respondent, the response device, the response device side, the response device orientation, the response device pose, time, previous inputs and/or responses, location in image, and/or the like. In various embodiments, a response may be an answer to a true/false question; an answer to a multiple choice question; an answer to a free-response question (e.g., a dial that indicates an integer and/or a floating point number); a meta and/or control command (e.g., next question, previous question, delete answer; new answer; save answer; cancel); a selection from among a set of options (e.g., a drop-down menu or other display); any other input (e.g., manipulate an onscreen cursor, wheel, dial, joystick, selection, point on a plane, and/or the like); and/or the like. It is to be understood that depending on implementation and/or poll, respondents may respond to questions synchronously (e.g., students answer the same question posed by a teacher), asynchronously (e.g., students answer quiz questions at their own pace), continuously (e.g., steering an object, manipulating a cursor), and/or the like. Further, respondents may have the ability to alter their selection, answer, and/or other input by submitting a new response.

The acquired image may be analyzed at 510. The image may be analyzed to determine whether the image contains one or more response devices with data that may be detected and/or decoded by the OPP. For example, the image may be analyzed to determine whether a respondent identifier and/or a response may be detected and/or decoded for at least one response device. See FIGS. 7 and 8 for additional details regarding analyzing the acquired image. If the image contains such response devices, the responses provided via such response devices may be determined at 515 (e.g., based on the analysis performed at 510).

In some embodiments, a progress indicator may be updated at 520. For example, the progress indicator may show (e.g., via a response grid) which respondents provided responses, what response a respondent provided, whether a respondent changed his or her response, how many of the respondents provided a response to a question, how many respondents selected each of the answer choices for a question, how many questions have been answered by respondents, and/or the like. In one implementation, the progress indicator may be shown to the operator (e.g., via an operator display). For example, a teacher may wish to observe how students in a class are proceeding with a poll (e.g., a quiz), but may not wish to show this information to the students. In another implementation, the progress indicator may be shown to respondents (e.g., via a respondents display). For example, the teacher may wish to show each student whether his or her response to the poll has been correctly detected and/or decoded by the OPP.

A determination may be made at 525 whether to continue the poll. In one embodiment, the poll may be continued until an input is received from the operator indicating otherwise (e.g., until the operator presses the "Pause Poll" or the "Stop Poll" button of the OPP application). In another embodiment, the poll may be continued for a predetermined amount of time (e.g., for one hour allotted for a quiz). If the poll should be continued, the next image may be acquired at 505. For example, the next image may be handled as described above to determine whether additional responses (e.g., responses from other respondents, responses to other questions, additional responses for the same question, and/or the like) have been received.

If the poll should not be continued, the OPP may stop acquiring and/or analyzing images. Accordingly, further responses may not be accepted. Results of the poll may be saved at 530. In one embodiment, data regarding responses and/or respondents may be saved. For example, responses, respondents' identifiers, response timings, response locations, response images, respondent images, and/or the like may be saved. In one implementation, such data may be saved in the responses data store 1630*f* using one or more SQL queries substantially in the following form:
  INSERT INTO Responses (ResponseID, Response, RespondentID, PollID)
  VALUES ("response identifier", "response", "respondent's identifier", "poll's identifier")
In another embodiment, data regarding the poll may be saved. For example, poll statistics, such as grades and/or averages, by student, by question, by question type, by standard, by topic, by chapter, by difficulty, by level, and/or the like may be saved. In one implementation, such data may be saved in the polls data store 1630*d* using one or more SQL queries substantially in the following form:
  INSERT INTO Polls (PollID, RespondentID, Grade)
  VALUES ("poll's identifier", "respondent's identifier", "grade for the poll")
In various implementations, data may be saved to a local data store, may be synchronized with an OPP server, and/or the like. Furthermore, it is to be understood that data may be saved at times other than after the poll is stopped—in various implementations, data may be saved before, during, and/or after the poll is stopped (e.g., during any of 501 through 535).

In some embodiments, results of the poll may be displayed at 535. For example, displayed results may include responses that respondents provided, correct answers, poll statistics (e.g., graphs, charts, tables), and/or the like. In one implementation, the results of the poll may be displayed to the operator. In another implementation, the results of the poll may be displayed to the respondents. Furthermore, in some embodiments, the results of the poll (e.g., in whole or in part), of a series of polls (e.g., for the duration of the course), and/or the like may be shared by the OPP and/or by the operator and/or by the respondents with others. In some embodiments, these others may also be granted permission to share poll results and/or other OPP data with still others. For example, a teacher may share the results of a quiz with a student's parents (e.g., by instructing the OPP to send an email to an email address associated with the student—e.g., to the email address stored in the users data store 1630*a*) to help the student's parents coach the student in areas in which the student is weak.

Figure 6:
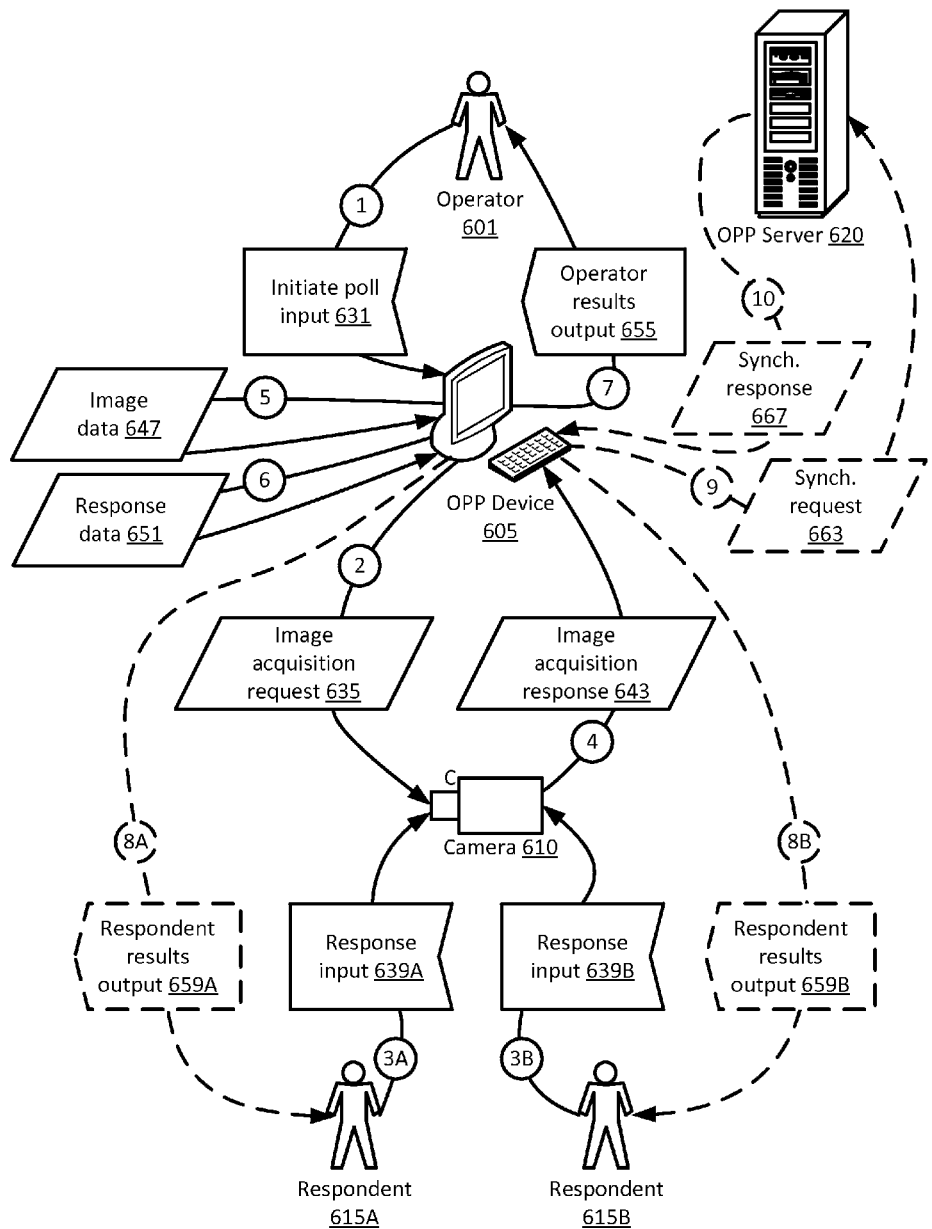
FIG. 6 shows an exemplary poll administering data flow diagram in one embodiment of the OPP.

FIG. 6 shows a data flow diagram in one embodiment of the OPP. In FIG. 6, dashed lines indicate data flow elements that may be more likely to be optional. FIG. 6 provides an example of how data may flow to, through, and/or from the OPP when the OPP facilitates administering a poll. In FIG. 6, an operator 601 may initiate a poll via an initiate poll input 631 to the OPP device 605 (i.e., a computer system as discussed with regard to FIG. 16). For example, the initiate poll input may include data such as a selection of a poll, a selection of one or more questions, a selection of one or more respondents participating in the poll, a command to start a poll, and/or the like.

The OPP device may send an image acquisition request 635 to camera 610. The image acquisition request may be a programmatic command to the camera (e.g., sent via a USB cable) to begin acquiring images. In various implementations, the camera may be one or more digital cameras, webcams, video cameras, electronically moveable pan tilt zoom (PTZ) cameras, sensors, cameras embedded in mobile devices (e.g., smart phones, tablets, media players), and/or the like peripheral devices. In various implementations, the camera may be discreet, external, embedded, integrated into the OPP device, and/or the like.

The camera may capture an image with response inputs 639A, 639B from respondents 615A, 615B, respectively. For example, the response inputs may include data such as the response (e.g., an answer, a meta and/or control command, a selection, cursor movement, and/or other input), respondent ID, and/or the like. The response inputs may be provided via one or more response devices. In various embodiments, a response device may be a reflective surface (e.g., a sheet of reinforced paper, a card, clothing, and/or the like printed with a symbology), a light-emitting object (e.g., a laser pointer, a flashlight, an omnidirectional source, an array and/or pattern of emitters, a stencil and/or mask over light source), a body part (e.g., a gesture, a facial expression), an object (e.g., objects having different shapes, colors, size), an audio input (e.g., a beep, a tone, speech), and/or the like.

The camera may send an image acquisition response 643 to the OPP device. The image acquisition response may include data such as an image (e.g., in the JPEG image format), audio (e.g., in the WAV audio format), metadata (e.g., data information, time information, geolocation information, camera settings, and/or the like stored in exchangeable image file format (EXIF)), and/or the like.

The OPP device may analyze image data 647. The image data may be analyzed to determine information such as a response, a respondent identifier, and/or the like for one or more respondents. For example, data regarding the image may be retrieved from the images data store 1630e using one or more SQL queries substantially in the following form:

SELECT ImageContent
FROM Images
WHERE ImageID="image identifier of the image being analyzed"

The OPP device may analyze response data 651. The response data may be analyzed to determine information such as statistics for one or more respondents, questions, polls, and/or the like. For example, data regarding responses may be retrieved from the responses data store 1630f using one or more SQL queries substantially in the following form:

SELECT *
FROM Responses
WHERE PollID="poll identifier of the poll being analyzed"

The OPP device may provide an operator results output 655 to the operator. For example, the operator results output may include data such as responses that respondents provided, correct answers, poll statistics (e.g., graphs, charts, tables), and/or the like. In one embodiment, the operator results output may be displayed to the operator using the OPP application via the operator's monitor. In another embodiment, the operator results output may be printed out by the operator using the OPP application via a printer.

In some embodiments, the OPP device may provide one or more respondent results outputs 659A, 659B to the respondents. For example, the respondent results outputs may include data such as responses that respondents provided, correct answers, poll statistics (e.g., graphs, charts, tables), and/or the like. In one embodiment, a common respondent results output may be displayed to respondents via one or more respondent monitors (e.g., students may see how each of the students in a class answered a question, students may be unable to see other students' responses, and/or the like). In another embodiment, different results outputs may be displayed to respondents via one or more respondent monitors (e.g., each student may see his or her own answer to a question, but may not see how other students answered the question).

In some embodiments, the OPP device may synchronize data with an OPP server 620. The OPP server may be a cloud server, a server in a client-server architecture in which the OPP device is a client, and/or the like. In one implementation, the OPP device may initiate synchronization by sending a synchronization request 663 to the OPP server. For example, the synchronization request may include data regarding the poll, regarding the responses, regarding statistics, and/or the like, and may be in XML format substantially in the following form:

<XML>
<PollData>data regarding a poll</PollData>
<ResponsesData> data regarding responses</ResponsesData>
<Statistics> data regarding statistics</Statistics>
</XML>

The OPP server may respond with a synchronization response 667. For example, the synchronization response may confirm that data has been received, may request additional data, may provide data from the OPP server (e.g., new questions that may be used in future polls), and/or the like, and may be in XML format substantially in the following form:

<XML>
<Status> data received successfully</Status>
</XML>

Figure 7:
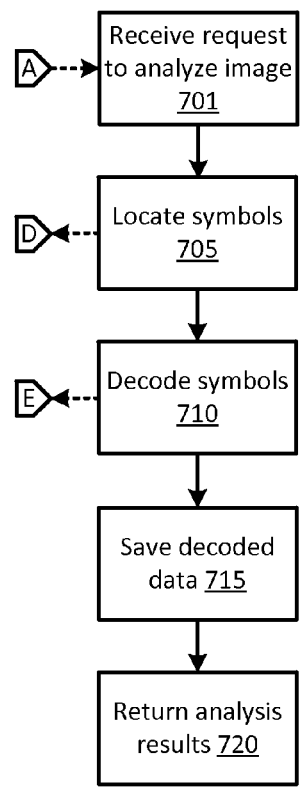
FIG. 7 shows a logic flow diagram illustrating an exemplary image analyzing (IA) component in one embodiment of the OPP.

FIG. 7 shows a logic flow diagram illustrating an exemplary image analyzing (IA) component in one embodiment of the OPP. In FIG. 7, a request to analyze an image may be received at 701. In one embodiment, this request may be received as a result of a programmatic command of the OPP application (e.g., written in C++). In one implementation, the programmatic command may include image data. In another implementation, the programmatic command may include an image identifier that may be used to access image data. For example, image data may be retrieved from the images data store 1630e using one or more SQL queries substantially in the following form:

SELECT ImageContent
FROM Images
WHERE ImageID="image identifier of the image being analyzed"

A determination may be made at 705 whether symbols may be located. In various embodiments, the contours of possible symbols may be determined. In some implementations, one or more validation checks (e.g., to determine whether the symbols satisfy certain size, shape, color, brightness, and/or the like conditions) may be performed to determine whether the contours may be possible valid symbols. See FIG. 11 for additional details regarding locating symbols.

A determination may be made at 710 whether the located symbols may be decoded. In various embodiments, the OPP may attempt to decode possible symbols specified by the contours. In various implementations, the OPP may attempt to determine orientations of the symbols, the angles off of vertical (e.g., between −45 and 45 degrees) at which the symbols were held, the poses (e.g., position and/or orientation) at which the symbols were held, responses specified by the symbols, the identities of the respondents specified by the symbols, and/or the like. Data specified by the decoded symbols may be saved at 715 (e.g., in the responses data store 1630f). See FIG. 13 for additional details regarding decoding symbols.

The results of the analysis may be returned at 720. In one embodiment, the results of the analysis may comprise data specified by the decoded symbols. For example, data specified by a decoded symbol may be used to determine the identity of a respondent and/or the response provided by the respondent.

Figure 8:
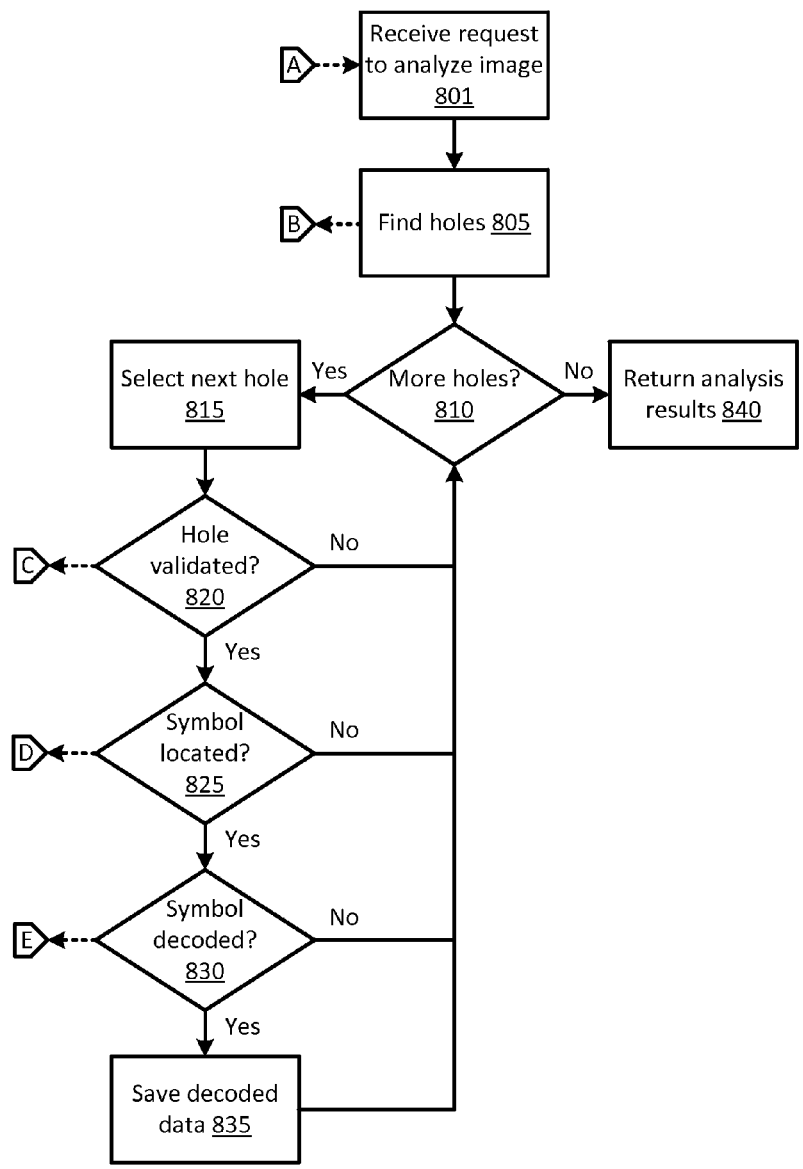
FIG. 8 shows a logic flow diagram illustrating an exemplary image analyzing (IA) component in another embodiment of the OPP.

FIG. 8 shows a logic flow diagram illustrating an exemplary image analyzing (IA) component in another embodiment of the OPP. In FIG. 8, a request to analyze an image may be received at 801. In one embodiment, this request may be received as a result of a programmatic command of the OPP application (e.g., written in C++). In one implementation, the programmatic command may include image data. In another implementation, the programmatic command may include an image identifier that may be used to access image data. For example, image data may be retrieved from the images data store 1630e using one or more SQL queries substantially in the following form:

SELECT ImageContent
FROM Images
WHERE ImageID="image identifier of the image being analyzed"

At 805 the OPP may attempt to find holes (as described in FIG. 2) that may be present in the image. In one embodiment, the OPP may attempt to find holes by trying to find strong edges in the image that form closed loops with no edges inside the loop. For example, contours meeting these conditions may be saved to a list (e.g., a C++ vector) of hole contours. See FIG. 9 for additional details regarding finding holes.

A determination may be made at 810 whether more holes should be analyzed. In one embodiment, the list of holes that were found at 805 may be iterated through (e.g., using a for loop) until each hole is analyzed. If more holes remain to be analyzed, the next hole may be selected for analysis at 815. For example the for loop may be implemented in C++ substantially in the following form:

for (int i=0; i<arrayHoles.size( ); ++i)
    AnalyzeHole(arrayHoles[i]);

A determination may be made at 820 whether the selected hole may be validated. In various embodiments, one or more validation checks (e.g., to determine whether the selected hole satisfies certain size, shape, color, brightness, and/or the like conditions) may be performed to determine whether the selected hole may be the center of a symbol. For example, if the selected hole passes the validation checks it may be analyzed further, but if the selected hole fails the validation checks it may be discarded and the next hole may be selected for analysis. See FIG. 10 for additional details regarding validating holes.

A determination may be made at 825 whether a symbol may be located. In various embodiments, the contour of a possible symbol associated with the selected hole may be determined. In some implementations, one or more validation checks (e.g., to determine whether the symbol satisfies certain size, shape, color, brightness, and/or the like conditions) may be performed to determine whether the contour may be a possible valid symbol. For example, if the contour passes the validation checks it may be analyzed further, but if the contour fails the validation checks it may be discarded and the next hole may be selected for analysis. See FIG. 11 for additional details regarding locating symbols.

A determination may be made at 830 whether a symbol may be decoded. In various embodiments, the OPP may attempt to decode a possible symbol specified by the contour. In various implementations, the OPP may attempt to determine the orientation of the symbol, the angle off of vertical (e.g., between −45 and 45 degrees) at which the symbol was held, the pose (e.g., position and/or orientation) at which the symbol was held, the response specified by the symbol, the identity of the respondent specified by the symbol, and/or the like. For example, if the OPP decodes the symbol, data specified by the symbol may be saved at 835 (e.g., in the responses data store 1630f), but if the OPP fails to decode the symbol, it may be discarded and the next hole may be selected for analysis. See FIG. 13 for additional details regarding decoding symbols.

If no more holes remain to be analyzed, the results of the analysis may be returned at 840. In one embodiment, the results of the analysis may comprise data specified by the decoded symbols. For example, data specified by a decoded symbol may be used to determine the identity of a respondent and/or the response provided by the respondent.

Figure 9:
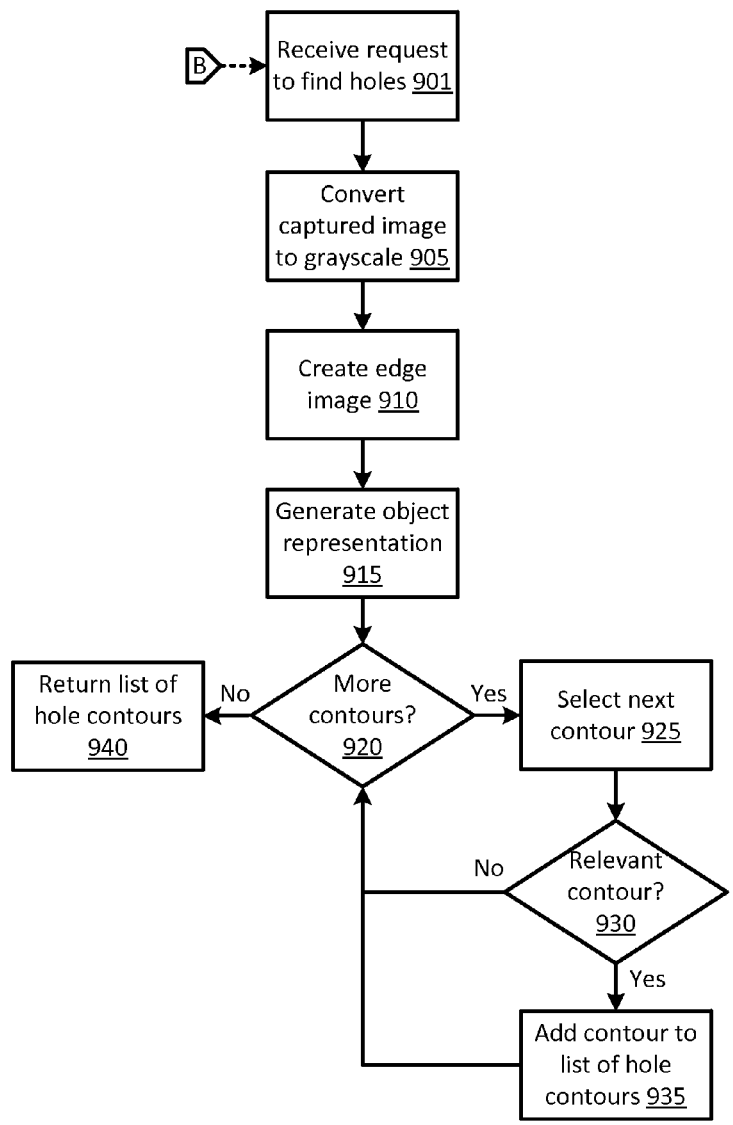
FIG. 9 shows a logic flow diagram illustrating an exemplary hole finding (HF) component in one embodiment of the OPP.

FIG. 9 shows a logic flow diagram illustrating an exemplary hole finding (HF) component in one embodiment of the OPP. In FIG. 9, a request to find holes may be received at 901. In one embodiment, the request to find holes may include image data that should be analyzed (e.g., the captured image).

The captured image may be converted to a grayscale image at 905. In one embodiment, each pixel's RGB color space value may be analyzed (e.g., based on luminance) and assigned a corresponding grayscale value to produce the grayscale image.

An edge image may be created from the grayscale image at 910. A binary (e.g., black and white) edge image may be used to differentiate strong edges from weak edges and/or unvarying areas. In one embodiment, pixels in the grayscale image having strong edges (e.g., abrupt brightness changes) may be white in the edge image, while pixels with weak edges and/or unvarying areas in the grayscale image may be black in the edge image. In one implementation, Canny edge detection may be used to generate the edge image.

An object representation of contours may be generated at 915. In one embodiment, contour finding may be performed on the edge image to generate a hierarchical representation (e.g., a tree) of the objects (e.g., connected pixels of the same color) in the edge image. For example, a contour in the tree may be a list of the pixels making up the contour's outer edge, and the hierarchical representation may indicate whether a contour is located inside another contour (e.g., a contour that is within another contour is a child of the containing contour).

A determination may be made at 920 whether more contours should be analyzed. In one embodiment, the hierarchical representation of contours that were found at 915 may be iterated through (e.g., using an inorder traversal) until each contour is analyzed. If more contours remain to be analyzed, the next contour may be selected for analysis at 925.

A determination may be made at 930 whether a contour is relevant. In one embodiment, a contour is relevant if the contour satisfies the following two conditions. First, the contour represents the exterior of a black area in the edge image (e.g., having tree data model depth that is an odd number). This ensures that the edge around the hole is a closed loop (i.e., an uninterrupted edge). Second, the contour should have no child contours (e.g., no children in the tree data model). This ensures that there are no edges inside the hole.

If the contour is relevant, the contour may be added to the list of hole contours at 935. If the contour is not relevant, it may be discarded and the next contour may be selected for analysis. If no more contours should to be analyzed, the list of hole contours may be returned at 940.

Figure 10:
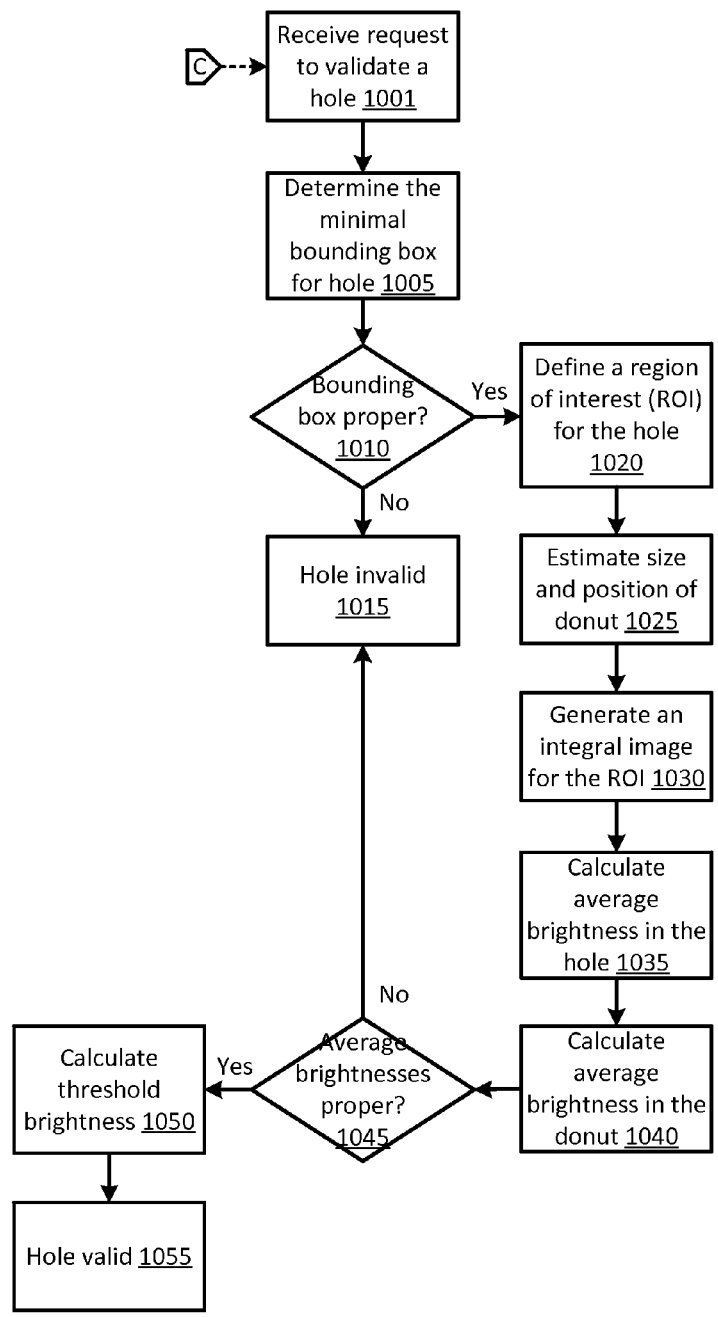
FIG. 10 shows a logic flow diagram illustrating an exemplary hole validating (HV) component in one embodiment of the OPP.

FIG. 10 shows a logic flow diagram illustrating an exemplary hole validating (HV) component in one embodiment of the OPP. In FIG. 10, a request to validate a hole may be received at 1001. In one embodiment, the request to validate a hole may include a hole contour to be analyzed.

The minimum bounding box (e.g., a rotated rectangle) for the hole contour may be determined at 1005. In one embodiment, the Rotating Calipers method may be used to determine the minimum bounding box.

A determination may be made whether the minimum bounding box is proper at 1010. In one embodiment, the minimum bounding box is proper if it is approximately square. In one implementation, the lengths of the width and height of the minimum bounding box may be compared, and if the difference between these lengths is less than a predetermined threshold (e.g., 5 percent, 5 pixels), the minimum bounding box may be considered approximately square. In another embodiment, the minimum bounding box is proper if the hole contour approximately fills the minimum bounding box. In one implementation, the areas of the hole contour and the minimum bounding box may be compared, and if the difference between these areas is less than a predetermined threshold (e.g., 10 percent, 20 pixels), the hole contour may be considered to approximately fill the minimum bounding box.

If the minimum bounding box is not proper, the hole may be considered invalid at 1015. Otherwise, a region of interest (ROI) for the hole may be defined at 1020. In one embodiment, the bounding upright (e.g., axis-aligned) rectangle for the hole may be determined. In one implementation, the coordinates of the pixels (e.g., as (x, y) coordinates) in the hole contour may be examined to determine pixels with coordinates (min(x), y), (max(x), y), (x, min(y)), (x, max(y)), and the bounding upright rectangle may be specified by coordinates (min(x), min(y)), (max(x), max(y)). The ROI may be defined such that it contains the entire symbol under the assumption that the hole is the center of a symbol (e.g., at least five times as wide and high as the hole for the symbology in FIG. 3). For example, the ROI may be defined as a rectangle that has the width and height that are seven times those of the bounding upright rectangle, with the bounding upright rectangle in the center.

The size and/or position of the donut (as described in FIG. 2) may be estimated at 1025. In one embodiment, the bounding upright rectangle may be used to make this estimate. For example, the donut may be estimated to be a rectangle that has the width and height that are three times (e.g., for the symbology in FIG. 3) those of the bounding upright rectangle, with the bounding upright rectangle in the center.

An integral image for the ROI may be generated at 1030. In one embodiment, the grayscale image (e.g., created at 905) may be used to generate the integral image for the ROI. The average brightness in the hole may be calculated at 1035 and the average brightness in the donut may be calculated at 1040. In one embodiment, the integral image may be used for these calculations.

A determination may be made at 1045 whether the average brightnesses in the hole and/or in the donut are proper. In one embodiment, the average brightness in the hole may be compared to the average brightness in the donut to determine whether the average brightness in the hole is sufficiently greater (e.g., based on a threshold value) than the average brightness in the donut (e.g., for the symbology in FIG. 3).

If the average brightnesses are not proper, the hole may be considered invalid at 1015. Otherwise, a threshold brightness value for the hole may be calculated at 1050 and the hole may be considered valid at 1055. In one embodiment, the threshold brightness value may be calculated as the average of the average brightness in the hole and the average brightness in the donut.

Figure 11:
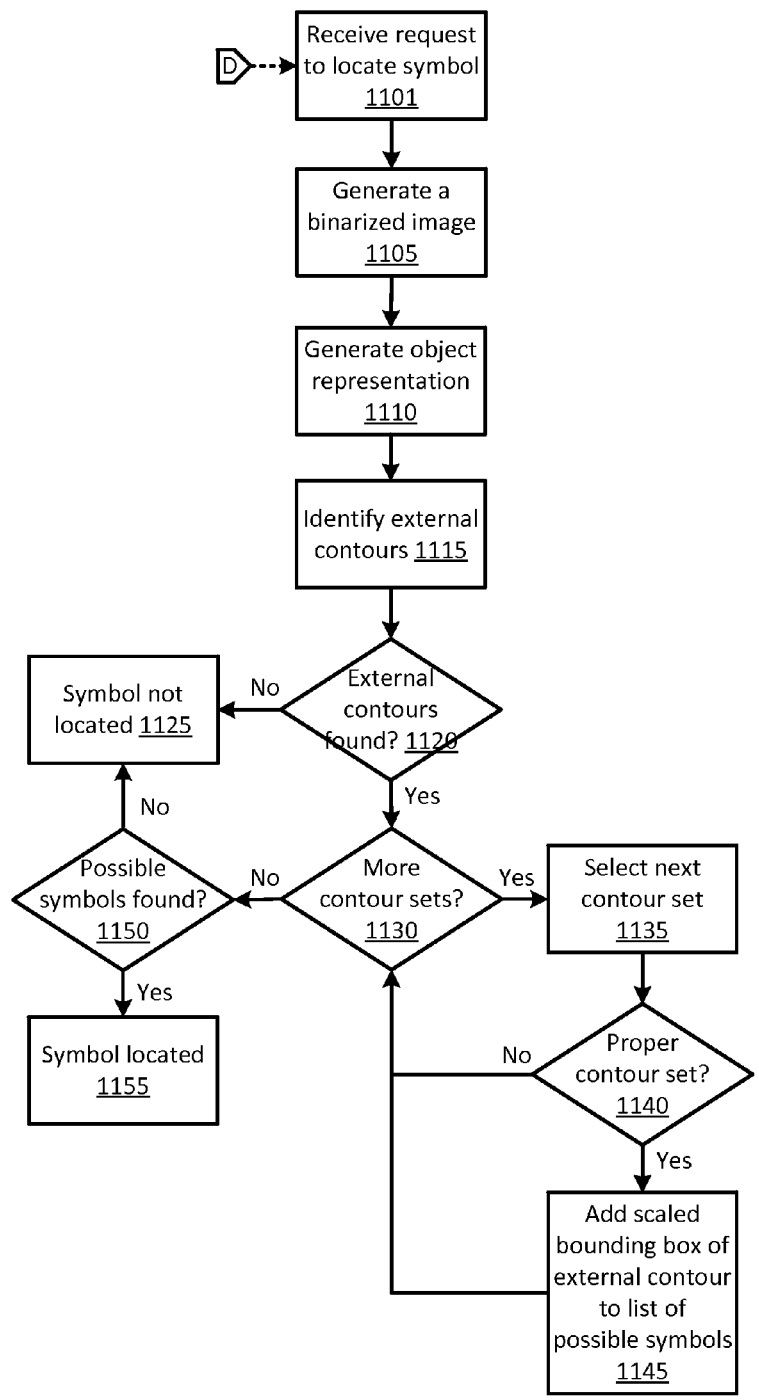
FIG. 11 shows a logic flow diagram illustrating an exemplary symbol locating (SL) component in one embodiment of the OPP.

FIG. 11 shows a logic flow diagram illustrating an exemplary symbol locating (SL) component in one embodiment of the OPP. In FIG. 11, a request to locate a symbol (e.g., for the symbology in FIG. 3) may be received at 1101. In one embodiment, the request to locate symbols may include image data that should be analyzed (e.g., the captured image). In another embodiment, the request to locate symbols may include the ROI that should be analyzed.

A binarized image may be generated at 1105. In one embodiment, to generate the binarized image, the brightness of the pixels may be compared to a threshold brightness value (e.g., 50 percent), and pixels brighter than the threshold value may be set to white, while pixels darker than the threshold value may be set to black. In one implementation, the binarized image may be generated for the ROI based on the threshold brightness value (e.g., calculated at 1050) as applied to the grayscale image (e.g., created at 905).

Object representation for the binarized image may be generated at 1110. In one embodiment, the object representation may be generated for the entire image. In another embodiment, the object representation may be generated for the ROI. In one implementation, contour finding may be performed on the binarized image to generate a hierarchical representation (e.g., a tree) of the objects (e.g., connected pixels of the same color) in the binarized image. For example, a contour in the tree may be a list of the pixels making up the contour's outer edge, and the hierarchical representation may indicate whether a contour is located inside another contour (e.g., a contour that is within another contour is a child of the containing contour).

External contours (e.g., the outside border of the black cells in the symbol) in the binarized image may be identified at 1115. For example, external contours may be those that have one child contour (e.g., the child contour is the hole for the symbol) and whose child contour has no children (e.g., the hole is white). In one embodiment, the hierarchical representation of contours that were found at 1110 may be iterated through (e.g., using an inorder traversal) and each external contour may be added to a list of identifiers of external contours.

A determination may be made at 1120 whether external contours have been found (e.g., whether the length of the list of identifiers of external contours is greater than zero). If no external contours have been found, no symbols have been located 1125. Otherwise, a determination may be made at 1130 whether more contour sets should be analyzed. If more contour sets remain to be analyzed, the next contour set may be selected for analysis at 1135.

A determination may be made at 1140 whether the contour set is proper. In one embodiment, the minimum bounding boxes for the parent contour (e.g., the external contour) and/or for the child contour (e.g., the hole contour) may be determined. In one implementation, the average size of the parent contour minimum bounding box (e.g., by finding the mean of the box's height and width) and/or of the child contour minimum bounding box may be calculated. The contour set may be considered proper if the ratio of the average size of the parent contour minimum bounding box is approximately 5 times (e.g., between 4.5 and 5.5 times) the average size of the child contour minimum bounding box (e.g., for the symbology in FIG. 3). In another implementation, the contour set may be considered proper if the parent contour minimum bounding box and/or the child contour minimum bounding box are approximately square. For example, the lengths of the width and height of a minimum bounding box may be compared, and if the difference between these lengths is less than a predetermined threshold (e.g., 5 percent, 5 pixels), the minimum bounding box may be considered approximately square. In yet another embodiment, the contour set may be considered proper if the parent contour minimum bounding box and the child contour minimum bounding box have approximately the same center. For example, the parent contour minimum bounding box and the child contour minimum bounding box have approximately the same center if the center of the parent contour minimum bounding box is inside the child contour minimum bounding box.

If the contour set is not proper, it may be discarded and the next contour set may be selected for analysis. Otherwise, the contour set may define the position of a possible symbol and may be added to a list of possible symbols at 1145. In one embodiment, the bounding box of the external contour may be scaled so that the vertices of this box are approximately centered in the corner cells of the symbol (e.g., scale this box by approximately 0.8 so that it is four-fifths its previous size), and the scaled bounding box may be added to the list of possible symbols.

If no more contour sets remain to be analyzed, a determination may be made at 1150 whether any possible symbols have been found (e.g., whether the length of the list of possible symbols is greater than zero). If no possible symbols have been found, no symbols have been located 1125. Otherwise, possible symbols have been located 1155.

Figure 12:
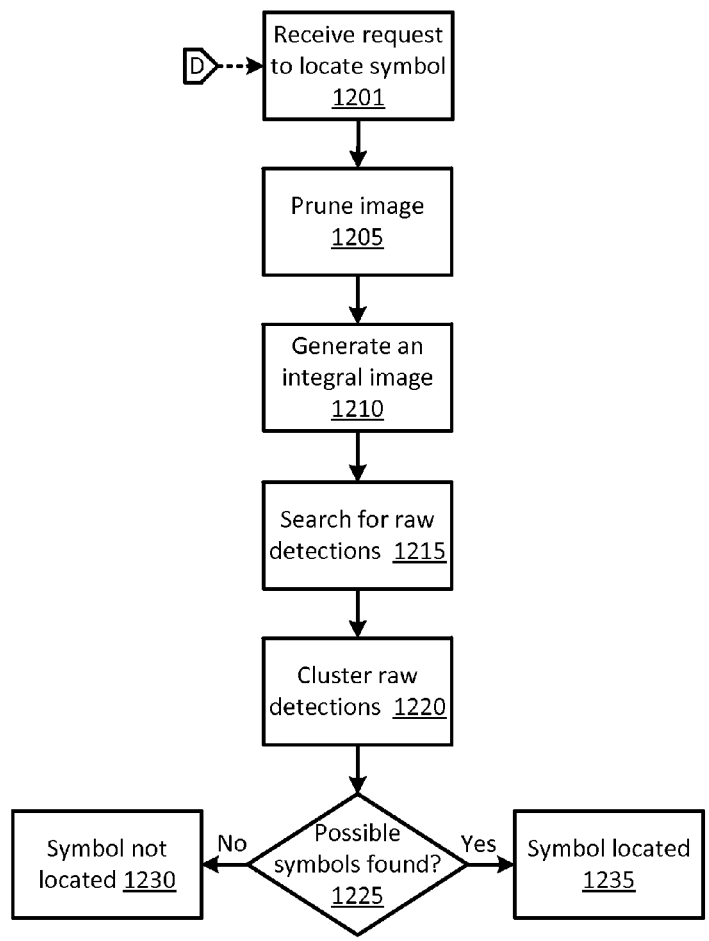
FIG. 12 shows a logic flow diagram illustrating an exemplary symbol locating (SL) component in another embodiment of the OPP.

FIG. 12 shows a logic flow diagram illustrating an exemplary symbol locating (SL) component in another embodiment of the OPP. In FIG. 12, a request to locate a symbol (e.g., for the symbology in FIG. 4) may be received at 1201. In one embodiment, the request to locate symbols may include image data that should be analyzed (e.g., the captured image).

The captured image may be pruned (e.g. to eliminate areas of the image where symbols are unlikely to exist) at 1205. In one embodiment, the captured image may be converted to a grayscale image. In one implementation, each pixel's RGB color space value may be analyzed (e.g., based on luminance) and assigned a corresponding grayscale value to produce the grayscale image. In one embodiment, an edge image may be created from the grayscale image. A binary (e.g., black and white) edge image may be used to differentiate strong edges from weak edges and/or unvarying areas. In one embodiment, pixels in the grayscale image having strong edges (e.g., abrupt brightness changes) may be white in the edge image, while pixels with weak edges and/or unvarying areas in the grayscale image may be black in the edge image. In one implementation, Canny edge detection may be used to generate the edge image. In one embodiment, areas with too much edge and/or too little edge may be pruned and not examined further. In another embodiment, areas with too much and/or too little color saturation, luminance, brightness, and/or the like may be pruned and not examined further. In yet another embodiment, background segmentation may be used to prune areas that are part of the scene background and therefore may not contain symbols.

An integral image may be generated at 1210. In one embodiment, the grayscale image (e.g., created at 1205) may be used to generate the integral image. For example, the integral image may facilitate determining the average intensity of rectangular regions by reducing the number of operations that have to be performed. A given pixel in the integral image may contain the sum of the pixel values of pixels directly above, directly to the left, and above and to the left of the given pixel. Accordingly, the integral image may facilitate determining the average intensity of a rectangular region because such a determination may be performed using the values of four pixels (e.g., one at each corner) regardless of the region's size.

The integral image may be searched for raw detections of possible symbols at 1215. In one embodiment, windows (e.g., square regions representing potential locations of possible symbols) may be used to search for raw detections of possible symbols. In one implementation, square regions of various sizes may be scanned across and/or down the integral image. Each window may be checked for the presence of a possible symbol. For example, regions of a window coinciding with the border cells of a symbol (e.g., for the symbology in FIG. 4) may be compared to their expected intensity, accommodating for the fact that the possible symbol may be in any of the orientations (e.g, each orientation representing a different selection). In one embodiment, in each window, the average pixel value for the border cells may be calculated and used as a threshold brightness value (e.g., approximately 50 percent gray). In one implementation, the average pixel value of each border cell may be compared to the threshold brightness value to determine whether the border cell is black or white. In another implementation, different threshold brightness values may be used for black and white (e.g., by multiplying the 50 percent gray threshold brightness value by one or more threshold factors, such as 1.05 for white and 0.95 for black). If a border cell is found that causes there to be no possible orientation of the possible symbol matching the border cells configuration specified by the symbology, the window may be discarded and the next window may be searched. If the border cells of a window match the expected intensities of an orientation of the border cell configuration specified by the symbology, the possible symbol associated with the window may be saved as a raw detection of a possible symbol. A representation of the matching orientation may also be saved and used to determine the desired selection (e.g., the answer provided by a respondent) for the possible symbol.

In one embodiment, groups of raw detections that significantly overlap each other may be clustered into one detection at 1220. In one implementation, clustering may be accomplished by averaging the position of the top-left corner and/or the width and/or the height of each raw detection. This clustered detection may provide a more precise estimate of the position and/or size of the possible detected symbol, may help eliminate false detections (e.g., if each clustered detection should come from some number, greater than one, of raw detections), and/or the like.

A determination may be made at 1225 whether any possible symbols have been found. If no clustered detections have been found, no symbols have been located 1230. Otherwise, possible symbols have been located 1235.

Figure 13:
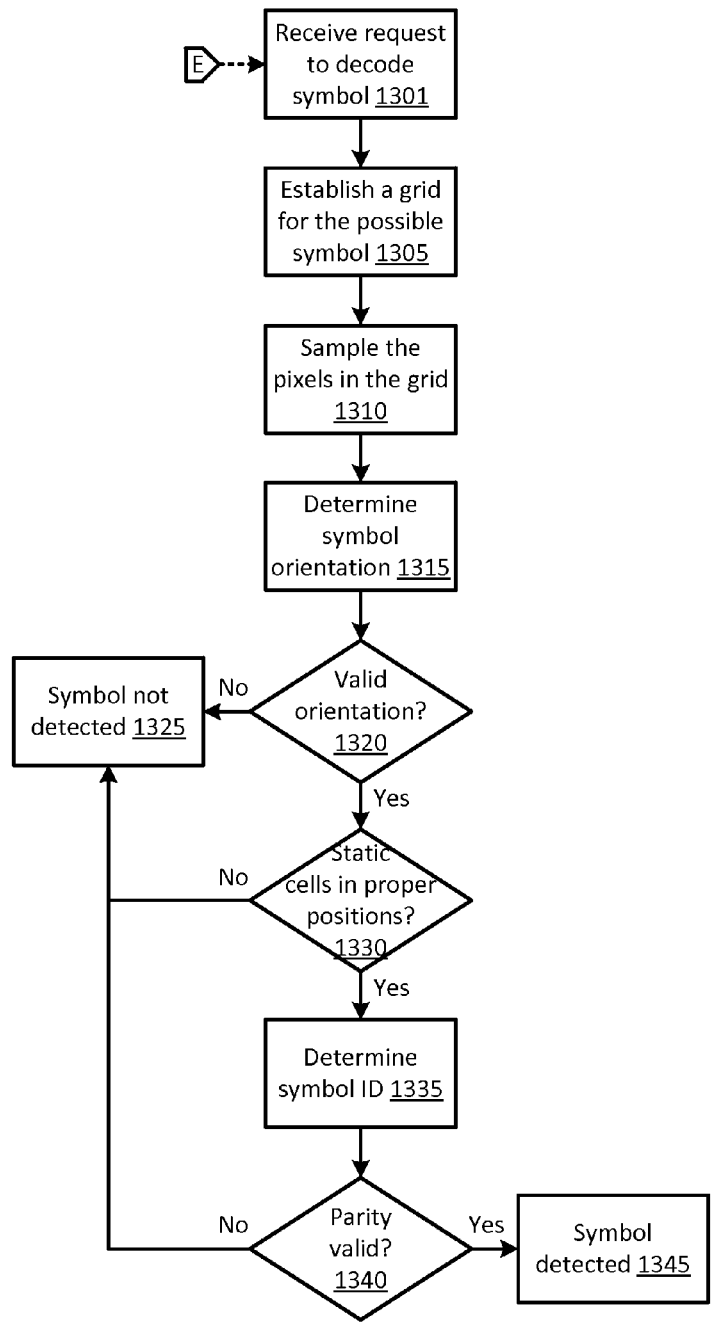
FIG. 13 shows a logic flow diagram illustrating an exemplary symbol decoding (SD) component in one embodiment of the OPP.

FIG. 13 shows a logic flow diagram illustrating an exemplary symbol decoding (SD) component in one embodiment of the OPP. In FIG. 13, a request to decode a possible symbol (e.g., for the symbology in FIG. 3) may be received at 1301.

A grid for the possible symbol may be established at 1305. In one embodiment, the grid may comprise a set of points for each cell in the possible symbol such that each point in the grid is a point approximately at the center of a cell in the possible symbol. In one implementation, the grid may be 5 points by 5 points, and each point in the grid may be determined based on the possible symbol's scaled bounding box (e.g., as determined at 1145). For example, the scaled bounding box may be divided into 16 equal rectangles, and the 25 points that form the vertices of these rectangles may provide the coordinates for the 25 points in the grid.

Each of the points in the grid may be sampled from the binarized image (e.g. as generated at 1105) associated with the possible symbol at 1310. In one embodiment, the coordinates of the points in the grid may be used to select a point in the binarized image, and the color (e.g., black or white) may be stored in a corresponding position in a 5 by 5 array representation of the possible symbol.

The orientation of the possible symbol may be determined at 1315. In one embodiment, the four orientation cells in the array representation may be examined to determine whether three of them are black and one of them is white. If this is not the case, the orientation is not valid 1320, and a symbol has not been detected and/or decoded 1325. Otherwise, the symbol's orientation (e.g., the answer provided by a respondent) may be determined based on the orientation cells.

A determination may be made at 1330 whether the static cells of the possible symbol are in their proper positions. In one embodiment, the cells in the array representation that should be static per symbology specifications may be examined to determine whether their color matches the color specified by the symbology specifications (e.g., based on data stored in the symbology data store 1630b).

If the static cells of the possible symbol are not in their proper positions, a symbol has not been detected and/or decoded 1325. Otherwise, data encoded by the possible symbol may be determined at 1335. In one embodiment, the six data cells in the array representation may be examined to determine an identifier (e.g., the identifier of the respondent).

Error checking may be performed at 1340 to confirm that the data determined at 1335 is valid. In one embodiment, the parity cell in the array representation may be examined to determine whether the parity cell's value matches the parity value associated with the data cells. If the parity value is not valid, a symbol has not been detected and/or decoded 1325. Otherwise, a symbol has been detected and/or decoded 1345.

Figure 14:
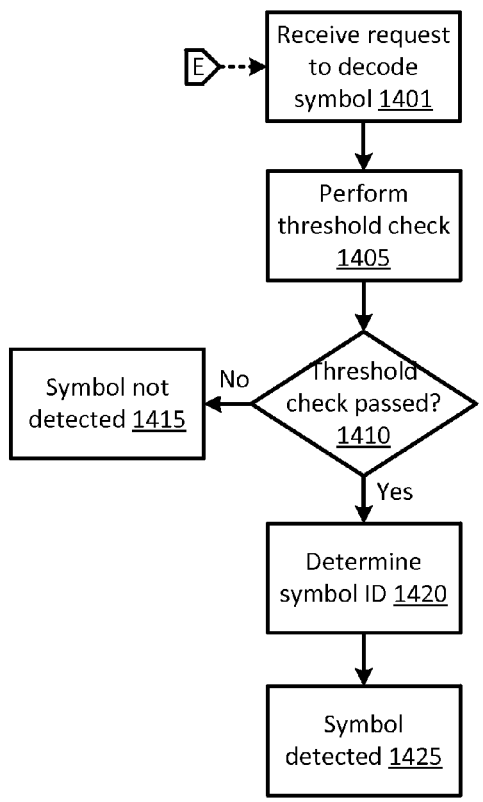
FIG. 14 shows a logic flow diagram illustrating an exemplary symbol decoding (SD) component in another embodiment of the OPP.

FIG. 14 shows a logic flow diagram illustrating an exemplary symbol decoding (SD) component in one embodiment of the OPP. In FIG. 14, a request to decode a possible symbol (e.g., for the symbology in FIG. 4) may be received at 1401.

A threshold check may be performed at 1405 for the possible symbol. In one embodiment, each border cell of the clustered detection (e.g., as determined at 1220) associated with the possible symbol may be rechecked to match the expected values using a new threshold brightness value that is based on the average value of the clustered detection's border, using more rigorous threshold factors, and/or the like. In one embodiment, the average value of each of the data cells of the clustered detection may be compared to the new threshold values. The clustered detection may pass the threshold check if the border cells and/or the data cells match the expected values.

A determination may be made at 1410 whether the possible symbol passed the threshold check. If the possible symbol did not pass the threshold check, a symbol has not been detected and/or decoded 1415. Otherwise, data encoded by the possible symbol may be determined at 1420. In one embodiment, the nine data cells may be examined to determine an identifier (e.g., a binary number representing the identifier of the respondent). In one implementation, a white data cell may represent a 1, and a black data cell may represent a 0. The orientation of the symbol may be accommodated for while determining the identifier to ensure that the data cells are correctly associated with their corresponding digits in the binary number. In this case, a symbol has been detected and/or decoded 1425.

FIG. 15 shows a screen shot diagram illustrating exemplary application screens in one embodiment of the OPP. In FIG. 15, Application Screen 1 1510 shows a feedback user interface that may be used by the OPP application (e.g., to facilitate conducting a poll). Application Screen 1 may include one or more controls 1511. For example, these controls may include (from left to right) a start poll button (e.g., to start a new poll and/or to resume a paused poll), a pause poll button (e.g., to pause the current poll), a stop poll button (e.g., to stop the current poll), a cancel poll button (e.g., to cancel the current poll without saving and/or displaying the results), a number of responses indicator (e.g., to indicate the number of responses detected and/or decoded), a setting button (e.g., to adjust various options of the OPP application). In another example, these controls may include (not shown) a rollback button (e.g., to recover a canceled poll and/or to allow more time for a stopped poll), controls that facilitate moving between questions, polls, and/or the like, controls that facilitate editing information, and/or the like.

Application Screen 1 may include a response grid 1513. In one embodiment, each respondent may have a response space (e.g., a rectangle) and/or a color (e.g., a unique color, a color that may be assigned to other respondents) in the response grid that is assigned to the respondent. In one implementation, the response space in the response grid assigned to a respondent may remain constant (e.g., for the duration of the course) to help the respondent find his or her response space (e.g., a rectangle in a specific location having a specific color). In another implementation, each response space may be shared among more than one respondent and/or may display information for one respondent at a time (e.g., response spaces may move, pop up, change colors to indicate the relevant respondent, and/or the like). In various embodiments, the response space may display information such as the respondent's identifier (e.g., number, symbol, initials, name, avatar, coded name), the respondent's response (e.g., answer choice, selection, pose, other input, and/or the like), the respondent's current and/or active question (e.g., for asynchronous questions), the number of times that the respondent submitted a response (e.g., 1 upon submission of the first answer), whether the respondent changed his or her response (e.g., selected a different answer choice), whether the respondent is participating in the current poll (e.g., a shaded rectangle indicates that the respondent is not participating), and/or the like. In some embodiments, the respondent may be informed regarding the status of detecting the respondent's response. For example, the color of the respondent's response space may change to another color (e.g., white) while the response device associated with that response space is actively being detected (e.g., detected in the most recent image frame). In another example, the color of the respondent's response space may change to another color (e.g., bright green) if a response different from a previously provided response is detected (e.g., a student changed his or her answer). In yet another example, the color of the respondent's response space may change to different colors depending on whether a response is correct or incorrect, hot or cold, high or low, and/or the like.

Application Screen 1 may include a "Hide Answers" button 1515. In one embodiment, this button may allow an operator specify whether the respondents should be able to see answers in the response grid. For example, a teacher may wish to hide the answers provided by students from other students (e.g., a student may see whether his or her answers has been detected, but may not see which answer has been detected). In another example, a teacher may wish to prevent students from knowing answers provided by other students by displaying encoded answers.

Application Screen 2 1530 shows a results user interface that may be used by the OPP application (e.g., to facilitate providing feedback to respondents). Application Screen 2 may include a results graph 1531. In various embodiments, the results graph (e.g., a bar graph, a box and whisker graph, a line graph, a scatter plot, a pie chart, a Venn diagram, and/or the like) may display the results of a poll. For example, the results graph may be a bar graph indicating how many respondents selected each of the answer choices (e.g., 6 students selected answer choice A). In some implementations, the results graph may highlight one or more answers (e.g., the correct answer or answers, the most common incorrect answer, and/or the like).

Application Screen 3 1550 shows an analysis user interface that may be used by the OPP application (e.g., to facilitate analysis of a poll by the operator). Application Screen 3 may include a class selection widget 1551. For example, the class selection widget may be a dropdown box that allows the operator to specify a class (e.g., associated with a list of students and/or questions) for which responses and/or analysis should be displayed. (e.g., the Period 4 Algebra II class).

Application Screen 3 may include an analysis table 1553. In one embodiment, the analysis table may include the identifiers of the respondents. For example, the analysis table may include the names of the students on the left side. In one embodiment, the analysis table may include identifiers of the questions in the poll. For example, the analysis table may include question numbers on top.

In one embodiment, the analysis table may include responses provided by the respondents. For example, correct responses may have a white background, incorrect responses may have a black background, unanswered questions may be shaded, and/or the like.

In various embodiments, the analysis table may include poll statistics. In one implementation, the analysis table may include grades for the poll (e.g., on the right side). For example, if a student answered three out of four questions correctly, the student may receive a grade of 75 percent. In another example, if a student answered three out of four questions, and answered two of these three questions correctly, the student may receive a grade of 66.7 percent. In one implementation, the analysis table may include averages per question (e.g., on the bottom). For example, if three out of four students answered a question correctly, the question may have an average of 75 percent. In another example, if three out of five students answered a question, and each of those three students answered the question correctly, the question may have an average of 100 percent. In one implementation, the analysis table may include an overall average (e.g., on the bottom right). For example, the overall average may be the average grade for a class. In one implementation, the analysis table may include information regarding correlations between results of the poll and other data such as demographics, location in the classroom, number of answer changes, and/or the like.

In various embodiments, the analysis table may be color-coded to help the operator identify patterns, outliers, data of interest, and/or the like. In one implementation, a row associated with a respondent may be highlighted based on the respondent's responses, grade, and/or the like. For example, if a student is struggling (e.g., received a grade on a quiz below a predetermined threshold), the row associated with the student may be highlighted. In one implementation, a column associated with a question may be highlighted based on the respondent's responses, question average, and/or the like. For example, if a question is unclear or too difficult (e.g., the average for the question is below a predetermined threshold), the column associated with the question may be highlighted.

In one embodiment, data displayed in the analysis table may be updated as soon as new information is available. For example, the analysis table may be updated during a poll as responses are received. In another embodiment, data displayed in the analysis table may be updated based on receiving a command from the operator. For example, the analysis table may be updated upon receiving a refresh data command from the operator.

Detailed Description of the OPP Coordinator

Figure 16:
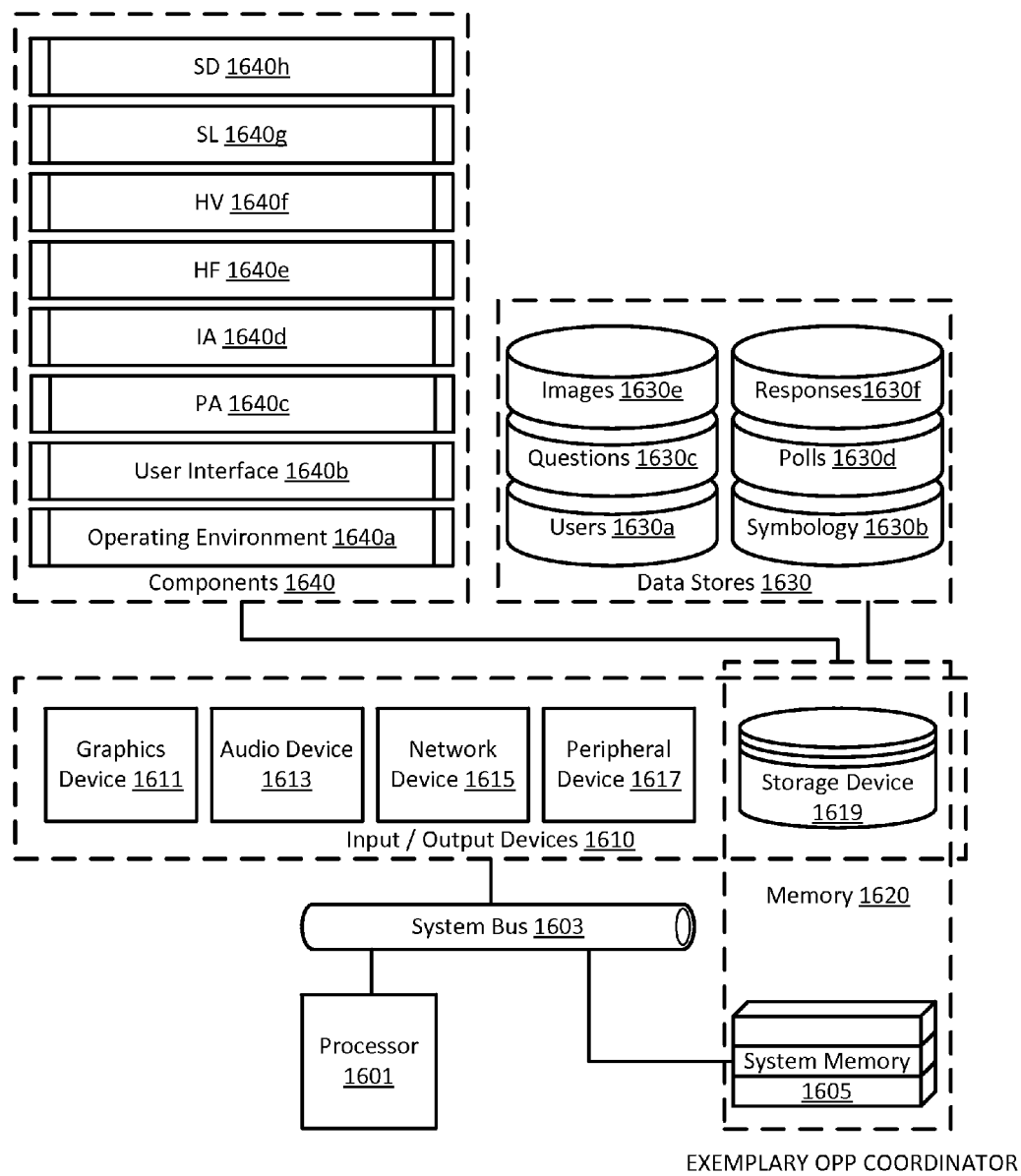
FIG. 16 shows a block diagram illustrating an exemplary OPP coordinator in one embodiment of the OPP.

FIG. 16 shows a block diagram illustrating an exemplary OPP coordinator in one embodiment of the OPP. The OPP coordinator facilitates the operation of the OPP via a computer system (e.g., one or more cloud computing systems, grid computing systems, virtualized computer systems, mainframe computers, servers, clients, nodes, desktops, mobile devices such as smart phones, cellular phones, tablets, personal digital assistants (PDAs), and/or the like, embedded computers, dedicated computers, a system on a chip (SOC)). For example, the OPP coordinator may receive, obtain, aggregate, process, generate, store, retrieve, send, delete, input, output, and/or the like data (including program data and program instructions); may execute program instructions; may communicate with computer systems, with nodes, with users, and/or the like. In various embodiments, the OPP coordinator may comprise a standalone computer system, a distributed computer system, a node in a computer network (i.e., a network of computer systems organized in a topology), a network of OPP coordinators, and/or the like. It is to be understood that the OPP coordinator and/or the various OPP coordinator elements (e.g., processor, system bus, memory, input/output devices) may be organized in any number of ways (i.e., using any number and configuration of computer systems, computer networks, nodes, OPP coordinator elements, and/or the like) to facilitate OPP operation. Furthermore, it is to be understood that the various OPP coordinator computer systems, OPP coordinator computer networks, OPP coordinator nodes, OPP coordinator elements, and/or the like may communicate among each other in any number of ways to facilitate OPP operation. As used in this disclosure, the term "user" refers generally to people and/or computer systems that interact with the OPP; the term "server" refers generally to a computer system, a program, and/or a combination thereof that handles requests and/or responds to requests from clients via a computer network; the term "client" refers generally to a computer system, a program, a user, and/or a combination thereof that generates requests and/or handles responses from servers via a computer network; the term "node" refers generally to a server, to a client, and/or to an intermediary computer system, program, and/or a combination thereof that facilitates transmission of and/or handling of requests and/or responses.

The OPP coordinator includes a processor 1601 that executes program instructions (e.g., OPP program instructions). In various embodiments, the processor may be a general purpose microprocessor (e.g., a central processing unit (CPU)), a dedicated microprocessor (e.g., a graphics processing unit (GPU), a physics processing unit (PPU), a digital signal processor (DSP), a network processor, and/or the like), an external processor, a plurality of processors (e.g., working in parallel, distributed, and/or the like), a microcontroller (e.g., for an embedded system), and/or the like. The processor may be implemented using integrated circuits (ICs), application-specific integrated circuits (ASICs), field-programmable gate arrays (FPGAs), and/or the like. In various implementations, the processor may comprise one or more cores, may include embedded elements (e.g., a coprocessor such as a math coprocessor, a cryptographic coprocessor, a physics coprocessor, and/or the like, registers, cache memory, software), may be synchronous (e.g., using a clock signal) or asynchronous (e.g., without a central clock), and/or the like. For example, the processor may be an AMD FX processor, an AMD Opteron processor, an AMD Geode LX processor, an Intel Core i7 processor, an Intel Xeon processor, an Intel Atom processor, an ARM Cortex processor, an IBM PowerPC processor, and/or the like.

The processor may be connected to system memory 1605 via a system bus 1603. The system bus may interconnect these and/or other elements of the OPP coordinator via electrical, electronic, optical, wireless, and/or the like communication links (e.g., the system bus may be integrated into a motherboard that interconnects OPP coordinator elements and provides power from a power supply). In various embodiments, the system bus may comprise one or more control buses, address buses, data buses, memory buses, peripheral buses, and/or the like. In various implementations, the system bus may be a parallel bus, a serial bus, a daisy chain design, a hub design, and/or the like. For example, the system bus may comprise a front-side bus, a back-side bus, AMD's HyperTransport, Intel's QuickPath Interconnect, a peripheral component interconnect (PCI) bus, an accelerated graphics port (AGP) bus, a PCI Express bus, a low pin count (LPC) bus, a universal serial bus (USB), and/or the like. The system memory, in various embodiments, may comprise registers, cache memory (e.g., level one, level two, level three), read only memory (ROM) (e.g., BIOS, flash memory), random access memory (RAM) (e.g., static RAM (SRAM), dynamic RAM (DRAM), error-correcting code (ECC) memory), and/ or the like. The system memory may be discreet, external, embedded, integrated into a CPU, and/or the like. The processor may access, read from, write to, store in, erase, modify, and/or the like, the system memory in accordance with program instructions (e.g., OPP program instructions) executed by the processor. The system memory may facilitate accessing, storing, retrieving, modifying, deleting, and/or the like data (e.g., OPP data) by the processor.

In various embodiments, input/output devices 1610 may be connected to the processor and/or to the system memory, and/or to one another via the system bus.

In some embodiments, the input/output devices may include one or more graphics devices 1611. The processor may make use of the one or more graphic devices in accordance with program instructions (e.g., OPP program instructions) executed by the processor. In one implementation, a graphics device may be a video card that may obtain (e.g., via a connected video camera), process (e.g., render a frame), output (e.g., via a connected monitor, television, and/or the like), and/or the like graphical (e.g., multimedia, video, image, text) data (e.g., OPP data). A video card may be connected to the system bus via an interface such as PCI, AGP, PCI Express, USB, PC Card, ExpressCard, and/or the like. A video card may use one or more graphics processing units (GPUs), for example, by utilizing AMD's CrossFireX and/or NVIDIA's SLI technologies. A video card may be connected via an interface (e.g., video graphics array (VGA), digital video interface (DVI), Mini-DVI, Micro-DVI, high-definition multimedia interface (HDMI), DisplayPort, Thunderbolt, composite video, S-Video, component video, and/or the like) to one or more displays (e.g., cathode ray tube (CRT), liquid crystal display (LCD), touchscreen, and/or the like) that display graphics. For example, a video card may be an AMD Radeon HD 6990, an ATI Mobility Radeon HD 5870, an AMD FirePro V9800P, an AMD Radeon E6760 MXM V3.0 Module, an NVIDIA GeForce GTX 590, an NVIDIA GeForce GTX 580M, an Intel HD Graphics 3000, and/or the like. In another implementation, a graphics device may be a video capture board that may obtain (e.g., via coaxial cable), process (e.g., overlay with other graphical data), capture, convert (e.g., between different formats, such as MPEG2 to H.264), and/or the like graphical data. A video capture board may be and/or include a TV tuner, may be compatible with a variety of broadcast signals (e.g., NTSC, PAL, ATSC, QAM) may be a part of a video card, and/or the like. For example, a video capture board may be an ATI All-in-Wonder HD, a Hauppauge ImpactVBR 01381, a Hauppauge WinTV-HVR-2250, a Hauppauge Colossus 01414, and/or the like. A graphics device may be discreet, external, embedded, integrated into a CPU, and/or the like. A graphics device may operate in combination with other graphics devices (e.g., in parallel) to provide improved capabilities, data throughput, color depth, and/or the like.

In some embodiments, the input/output devices may include one or more audio devices 1613. The processor may make use of the one or more audio devices in accordance with program instructions (e.g., OPP program instructions) executed by the processor. In one implementation, an audio device may be a sound card that may obtain (e.g., via a connected microphone), process, output (e.g., via connected speakers), and/or the like audio data (e.g., OPP data). A sound card may be connected to the system bus via an interface such as PCI, PCI Express, USB, PC Card, ExpressCard, and/or the like. A sound card may be connected via an interface (e.g., tip sleeve (TS), tip ring sleeve (TRS), RCA, TOSLINK, optical) to one or more amplifiers, speakers (e.g., mono, stereo, surround sound), subwoofers, digital musical instruments, and/or the like. For example, a sound card may be an Intel AC'97 integrated codec chip, an Intel HD Audio integrated codec chip, a Creative Sound Blaster X-Fi Titanium HD, a Creative Sound Blaster X-Fi Go! Pro, a Creative Sound Blaster Recon 3D, a Turtle Beach Riviera, a Turtle Beach Amigo II, and/or the like. An audio device may be discreet, external, embedded, integrated into a motherboard, and/or the like. An audio device may operate in combination with other audio devices (e.g., in parallel) to provide improved capabilities, data throughput, audio quality, and/or the like.

In some embodiments, the input/output devices may include one or more network devices 1615. The processor may make use of the one or more network devices in accordance with program instructions (e.g., OPP program instructions) executed by the processor. In one implementation, a network device may be a network card that may obtain (e.g., via a Category 5 Ethernet cable), process, output (e.g., via a wireless antenna), and/or the like network data (e.g., OPP data). A network card may be connected to the system bus via an interface such as PCI, PCI Express, USB, FireWire, PC Card, Express Card, and/or the like. A network card may be a wired network card (e.g., 10/100/1000, optical fiber), a wireless network card (e.g., Wi-Fi 802.11a/b/g/n/ac/ad, Bluetooth, Near Field Communication (NFC), TransferJet), a modem (e.g., dialup telephone-based, asymmetric digital subscriber line (ADSL), cable modem, power line modem, wireless modem based on cellular protocols such as high speed packet access (HSPA), evolution-data optimized (EV-DO), global system for mobile communications (GSM), worldwide interoperability for microwave access (WiMax), long term evolution (LTE), and/or the like, satellite modem, FM radio modem, radio-frequency identification (RFID) modem, infrared (IR) modem), and/or the like. For example, a network card may be an Intel EXPI9301CT, an Intel EXPI9402PT, a LINKSYS USB300M, a BUFFALO WLI-UC-G450, a Rosewill RNX-MiniN1, a TRENDnet TEW-623PI, a Rosewill RNX-N180UBE, an ASUS USB-BT211, a MOTOROLA SB6120, a U.S. Robotics USR5686G, a Zoom 5697-00-00F, a TRENDnet TPL-401E2K, a D-Link DHP-W306AV, a StarTech ET91000SC, a Broadcom BCM20791, a Broadcom InConcert BCM4330, a Broadcom BCM4360, an LG VL600, a Qualcomm MDM9600, a Toshiba TC35420 TransferJet device, and/or the like. A network device may be discreet, external, embedded, integrated into a motherboard, and/or the like. A network device may operate in combination with other network devices (e.g., in parallel) to provide improved data throughput, redundancy, and/or the like. For example, protocols such as link aggregation control protocol (LACP) based on IEEE 802.3AD-2000 or IEEE 802.1AX-2008 standards may be used. A network device may be used to connect to a local area network (LAN), a wide area network (WAN), a metropolitan area network (MAN), a personal area network, the Internet, an intranet, a Bluetooth network, an NFC network, a Wi-Fi network, a cellular network, and/or the like.

In some embodiments, the input/output devices may include one or more peripheral devices 1617. The processor may make use of the one or more peripheral devices in accordance with program instructions (e.g., OPP program instructions) executed by the processor. In various implementations, a peripheral device may be a digital camera, a video camera, a webcam, an electronically moveable pan tilt zoom (PTZ) camera, a monitor, a touchscreen display, active shutter 3D glasses, head-tracking 3D glasses, a remote control, an audio line-in, an audio line-out, a microphone, headphones, speakers, a subwoofer, a router, a hub, a switch, a firewall, an antenna, a keyboard, a mouse, a trackpad, a trackball, a digitizing tablet, a stylus, a joystick, a gamepad, a game controller, a force-feedback device, a laser, sensors (e.g., proximity sensor, rangefinder, ambient temperature sensor, ambient light sensor, humidity sensor, an accelerometer, a gyroscope, a motion sensor, an olfaction sensor, a biosensor, a chemical sensor, a magnetometer, a radar, a sonar, a location sensor such as global positioning system (GPS), Galileo, GLONASS, and/or the like), a printer, a fax, a scanner, a copier, a card reader, and/or the like. A peripheral device may be connected to the system bus via an interface such as PCI, PCI Express, USB, FireWire, VGA, DVI, Mini-DVI, Micro-DVI, HDMI, DisplayPort, Thunderbolt, composite video, S-Video, component video, PC Card, ExpressCard, serial port, parallel port, PS/2, TS, TRS, RCA, TOSLINK, network connection (e.g., wired such as Ethernet, optical fiber, and/or the like, wireless such as Wi-Fi, Bluetooth, NFC, cellular, and/or the like), a connector of another input/output device, and/or the like. A peripheral device may be discreet, external, embedded, integrated (e.g., into a processor, into a motherboard), and/or the like. A peripheral device may operate in combination with other peripheral devices (e.g., in parallel) to provide the OPP coordinator with a variety of input, output and processing capabilities.

In some embodiments, the input/output devices may include one or more storage devices 1619. The processor may access, read from, write to, store in, erase, modify, and/or the like a storage device in accordance with program instructions (e.g., OPP program instructions) executed by the processor. A storage device may facilitate accessing, storing, retrieving, modifying, deleting, and/or the like data (e.g., OPP data) by the processor. In one implementation, the processor may access data from the storage device directly via the system bus. In another implementation, the processor may access data from the storage device by instructing the storage device to transfer the data to the system memory and accessing the data from the system memory. In various embodiments, a storage device may be a hard disk drive (HDD), a solid-state drive (SSD), a floppy drive using diskettes, an optical disk drive (e.g., compact disk (CD-ROM) drive, CD-Recordable (CD-R) drive, CD-Rewriteable (CD-RW) drive, digital versatile disc (DVD-ROM) drive, DVD-R drive, DVD-RW drive, Blu-ray disk (BD) drive) using an optical medium, a magnetic tape drive using a magnetic tape, a memory card (e.g., a USB flash drive, a compact flash (CF) card, a secure digital extended capacity (SDXC) card), a network attached storage (NAS), a direct-attached storage (DAS), a storage area network (SAN), other processor-readable physical mediums, and/or the like. A storage device may be connected to the system bus via an interface such as PCI, PCI Express, USB, FireWire, PC Card, ExpressCard, integrated drive electronics (IDE), serial advanced technology attachment (SATA), external SATA (eSATA), small computer system interface (SCSI), serial attached SCSI (SAS), fibre channel (FC), network connection (e.g., wired such as Ethernet, optical fiber, and/or the like; wireless such as Wi-Fi, Bluetooth, NFC, cellular, and/or the like), and/or the like. A storage device may be discreet, external, embedded, integrated (e.g., into a motherboard, into another storage device), and/or the like. A storage device may operate in combination with other storage devices to provide improved capacity, data throughput, data redundancy, and/or the like. For example, protocols such as redundant array of independent disks (RAID) (e.g., RAID 0 (striping), RAID 1 (mirroring), RAID 5 (striping with distributed parity), hybrid RAID), just a bunch of drives (JBOD), and/or the like may be used. In another example, virtual and/or physical drives may be pooled to create a storage pool. In yet another example, an SSD cache may be used with a HDD to improve speed.

Together and/or separately the system memory 1605 and the one or more storage devices 1619 may be referred to as memory 1620 (i.e., physical memory).

OPP memory 1620 contains processor-operable (e.g., accessible) OPP data stores 1630. Data stores 1630 comprise data that may be used (e.g., by the OPP) via the OPP coordinator. Such data may be organized using one or more data formats such as a database (e.g., a relational database with database tables, an object-oriented database, a graph database, a hierarchical database), a flat file (e.g., organized into a tabular format), a binary file (e.g., a GIF file, an MPEG-4 file), a structured file (e.g., an HTML file, an XML file), a text file, and/or the like. Furthermore, data may be organized using one or more data structures such as an array, a queue, a stack, a set, a linked list, a map, a tree, a hash, a record, an object, a directed graph, and/or the like. In various embodiments, data stores may be organized in any number of ways (i.e., using any number and configuration of data formats, data structures, OPP coordinator elements, and/or the like) to facilitate OPP operation. For example, OPP data stores may comprise data stores 1630a-f implemented as one or more databases. A users data store 1630a may be a collection of database tables that include fields such as UserID, UserName, UserAvatar, UserEmail, UserPreferences, UserResponseSpace, UserColor, and/or the like. A symbology data store 1630b may be a collection of database tables that include fields such as SymbologyID, SymbologySpecifications, and/or the like. A questions data store 1630c may be a collection of database tables that include fields such as QuestionID, QuestionStandard, QuestionCourse, QuestionContent, QuestionType, QuestionDifficulty, QuestionText, QuestionMedia, QuestionAnswer, and/or the like. A polls data store 1630d may be a collection of database tables that include fields such as PollID, PollResults, PollQuestions, PollStatistics, PollDate, PollTime, and/or the like. An images data store 1630e may be a collection of database tables that include fields such as ImageID, ImageContent, ImageDate, ImageTime, ImageLocation, ImageAcquisitionDeviceID, and/or the like. A responses data store 1630f may be a collection of database tables that include fields such as ResponseID, Response, RespondentID, QuestionID, PollID, ResponseDate, ResponseTime, ResponseNumberOfSubmissionsCount, and/or the like. The OPP coordinator may use data stores 1630 to keep track of inputs, parameters, settings, variables, records, outputs, and/or the like.

OPP memory 1620 contains processor-operable (e.g., executable) OPP components 1640. Components 1640 comprise program components (including program instructions and any associated data stores) that are executed (e.g., by the OPP) via the OPP coordinator (i.e., via the processor) to transform OPP inputs into OPP outputs. It is to be understood that the various components and their subcomponents, capabilities, applications, and/or the like may be organized in any number of ways (i.e., using any number and configuration of components, subcomponents, capabilities, applications, OPP coordinator elements, and/or the like) to facilitate OPP operation. Furthermore, it is to be understood that the various components and their subcomponents, capabilities, applications, and/or the like may communicate among each other in any number of ways to facilitate OPP operation. For example, the various components and their subcomponents, capabilities, applications, and/or the like may be combined, integrated, consolidated, split up, distributed, and/or the like in any number of ways to facilitate OPP operation. In another example, a single or multiple instances of the various components and their subcomponents, capabilities, applications, and/or the like may be instantiated on each of a single OPP coordinator node, across multiple OPP coordinator nodes, and/or the like.

In various embodiments, program components may be developed using one or more programming languages, techniques, tools, and/or the like such as an assembly language, Ada, BASIC, C, C++, C#, COBOL, Fortran, Java, LabVIEW, Lisp, Mathematica, MATLAB, OCaml, PL/I, Smalltalk, Visual Basic for Applications (VBA), HTML, XML, CSS, JavaScript, JavaScript Object Notation (JSON), PHP, Perl, Ruby, Python, Asynchronous JavaScript and XML (AJAX), Simple Object Access Protocol (SOAP), SSL, ColdFusion, Microsoft .NET, Apache modules, Adobe Flash, Adobe AIR, Microsoft Silverlight, Windows PowerShell, batch files, Tcl, graphical user interface (GUI) toolkits, SQL, database adapters, web application programming interfaces (APIs), application server extensions, integrated development environments (IDEs), libraries (e.g., object libraries, class libraries, remote libraries), remote procedure calls (RPCs), Common Object Request Broker Architecture (CORBA), and/or the like.

In some embodiments, components 1640 may include an operating environment component 1640a. The operating environment component may facilitate operation of the OPP via various subcomponents.

In some implementations, the operating environment component may include an operating system subcomponent. The operating system subcomponent may provide an abstraction layer that facilitates the use of, communication among, common services for, interaction with, security of, and/or the like of various OPP coordinator elements, components, data stores, and/or the like.

In some embodiments, the operating system subcomponent may facilitate execution of program instructions (e.g., OPP program instructions) by the processor by providing process management capabilities. For example, the operating system subcomponent may facilitate the use of multiple processors, the execution of multiple processes, multitasking, and/or the like.

In some embodiments, the operating system subcomponent may facilitate the use of memory by the OPP. For example, the operating system subcomponent may allocate and/or free memory, facilitate memory addressing, provide memory segmentation and/or protection, provide virtual memory capability, facilitate caching, and/or the like. In another example, the operating system subcomponent may include a file system (e.g., File Allocation Table (FAT), New Technology File System (NTFS), Hierarchical File System Plus (HFS+), Universal Disk Format (UDF), Linear Tape File System (LTFS)) to facilitate storage, retrieval, deletion, aggregation, processing, generation, and/or the like of data.

In some embodiments, the operating system subcomponent may facilitate operation of and/or processing of data for and/or from input/output devices. For example, the operating system subcomponent may include one or more device drivers, interrupt handlers, file systems, and/or the like that allow interaction with input/output devices.

In some embodiments, the operating system subcomponent may facilitate operation of the OPP coordinator as a node in a computer network by providing support for one or more communications protocols. For example, the operating system subcomponent may include support for the internet protocol suite (i.e., Transmission Control Protocol/Internet Protocol (TCP/IP)) of network protocols such as TCP, IP, User Datagram Protocol (UDP), Mobile IP, and/or the like. In another example, the operating system subcomponent may include support for security protocols (e.g., Wired Equivalent Privacy (WEP), Wi-Fi Protected Access (WPA), WPA2) for wireless computer networks. In yet another example, the operating system subcomponent may include support for virtual private networks (VPNs).

In some embodiments, the operating system subcomponent may facilitate security of the OPP coordinator. For example, the operating system subcomponent may provide services such as authentication, authorization, audit, network intrusion-detection capabilities, firewall capabilities, antivirus capabilities, and/or the like.

In some embodiments, the operating system subcomponent may facilitate user interaction with the OPP by providing user interface elements that may be used by the OPP to generate a user interface. In one implementation, such user interface elements may include widgets (e.g., windows, dialog boxes, scrollbars, menu bars, tabs, ribbons, menus, buttons, text boxes, checkboxes, combo boxes, drop-down lists, list boxes, radio buttons, sliders, spinners, grids, labels, progress indicators, icons, tooltips, and/or the like) that may be used to obtain input from and/or provide output to the user. For example, such widgets may be used via a widget toolkit such as Microsoft Foundation Classes (MFC), Apple Cocoa Touch, Java Swing, GTK+, Qt, Yahoo! User Interface Library (YUI), and/or the like. In another implementation, such user interface elements may include sounds (e.g., event notification sounds stored in MP3 file format), animations, vibrations, and/or the like that may be used to inform the user regarding occurrence of various events. For example, the operating system subcomponent may include a user interface such as Windows Aero, Mac OS X Aqua, GNOME Shell, KDE Plasma Workspaces (e.g., Plasma Desktop, Plasma Netbook, Plasma Contour, Plasma Mobile), and/or the like.

In various embodiments the operating system subcomponent may comprise a single-user operating system, a multi-user operating system, a single-tasking operating system, a multitasking operating system, a single-processor operating system, a multiprocessor operating system, a distributed operating system, an embedded operating system, a real-time operating system, and/or the like. For example, the operating system subcomponent may comprise an operating system such as UNIX, LINUX, IBM i, Sun Solaris, Microsoft Windows Server, Microsoft DOS, Microsoft Windows 7, Apple Mac OS X, Apple iOS, Android, Symbian, Windows Phone 7, Blackberry QNX, and/or the like.

In some implementations, the operating environment component may include a database subcomponent. The database subcomponent may facilitate OPP capabilities such as storage, analysis, retrieval, access, modification, deletion, aggregation, generation, and/or the like of data (e.g., the use of data stores 1630). The database subcomponent may make use of database languages (e.g., Structured Query Language (SQL), XQuery), stored procedures, triggers, APIs, and/or the like to provide these capabilities. In various embodiments the database subcomponent may comprise a cloud database, a data warehouse, a distributed database, an embedded database, a parallel database, a real-time database, and/or the like. For example, the database subcomponent may comprise a database such as Microsoft SQL Server, Microsoft Access, MySQL, IBM DB2, Oracle Database, and/or the like.

In some implementations, the operating environment component may include an information handling subcomponent. The information handling subcomponent may provide the OPP with capabilities to serve, deliver, upload, obtain, present, download, and/or the like a variety of information. The information handling subcomponent may use protocols such as Hypertext Transfer Protocol (HTTP), Hypertext Transfer Protocol Secure (HTTPS), File Transfer Protocol (FTP), Telnet, Secure Shell (SSH), Transport Layer Security (TLS), Secure Sockets Layer (SSL), peer-to-peer (P2P) protocols (e.g., BitTorrent), and/or the like to handle communication of information such as web pages, files, multimedia content (e.g., streaming media), applications, and/or the like.

In some embodiments, the information handling subcomponent may facilitate the serving of information to users, OPP components, nodes in a computer network, web browsers, and/or the like. For example, the information handling subcomponent may comprise a web server such as Apache HTTP Server, Microsoft Internet Information Services (IIS), Oracle WebLogic Server, Adobe Flash Media Server, Adobe Content Server, and/or the like. Furthermore, a web server may include extensions, plug-ins, add-ons, servlets, and/or the like. For example, these may include Apache modules, IIS extensions, Java servlets, and/or the like. In some implementations, the information handling subcomponent may communicate with the database subcomponent via standards such as Open Database Connectivity (ODBC), Java Database Connectivity (JDBC), ActiveX Data Objects for .NET (ADO.NET), and/or the like. For example, the information handling subcomponent may use such standards to store, analyze, retrieve, access, modify, delete, aggregate, generate, and/or the like data (e.g., data from data stores 1630) via the database subcomponent.

In some embodiments, the information handling subcomponent may facilitate presentation of information obtained from users, OPP components, nodes in a computer network, web servers, and/or the like. For example, the information handling subcomponent may comprise a web browser such as Microsoft Internet Explorer, Mozilla Firefox, Apple Safari, Google Chrome, Opera Mobile, Amazon Silk, Nintendo 3DS Internet Browser, and/or the like. Furthermore, a web browser may include extensions, plug-ins, add-ons, applets, and/or the like. For example, these may include Adobe Flash Player, Adobe Acrobat plug-in, Microsoft Silverlight plug-in, Microsoft Office plug-in, Java plug-in, and/or the like.

In some implementations, the operating environment component may include a messaging subcomponent. The messaging subcomponent may facilitate OPP message communications capabilities. The messaging subcomponent may use protocols such as Simple Mail Transfer Protocol (SMTP), Internet Message Access Protocol (IMAP), Post Office Protocol (POP), Extensible Messaging and Presence Protocol (XMPP), Real-time Transport Protocol (RTP), Internet Relay Chat (IRC), Skype protocol, AOL's Open System for Communication in Realtime (OSCAR), Messaging Application Programming Interface (MAPI), Facebook API, and/or the like to facilitate OPP message communications. The messaging subcomponent may facilitate message communications such as email, instant messaging, Voice over IP (VoIP), video conferencing, Short Message Service (SMS), web chat, and/or the like. For example, the messaging subcomponent may comprise Microsoft Exchange Server, Microsoft Outlook, Sendmail, IBM Lotus Domino, Gmail, AOL Instant Messenger (AIM), Yahoo Messenger, ICQ, Trillian, Skype, Google Talk, Apple FaceTime, Apple iChat, Facebook Chat, and/or the like.

In some implementations, the operating environment component may include a security subcomponent that facilitates OPP security. In some embodiments, the security subcomponent may restrict access to the OPP, to one or more services provided by the OPP, to data associated with the OPP (e.g., stored in data stores 1630), to communication messages associated with the OPP, and/or the like to authorized users. Access may be granted via a login screen, via an API that obtains authentication information, via an authentication token, and/or the like. For example, the user may obtain access by providing a username and/or a password (e.g., a string of characters, a picture password), a personal identification number (PIN), an identification card, a magnetic stripe card, a smart card, a biometric identifier (e.g., a finger print, a voice print, a retina scan, a face scan), a gesture (e.g., a swipe), a media access control (MAC) address, an IP address, and/or the like. Various security models such as access-control lists (ACLs), capability-based security, hierarchical protection domains, and/or the like may be used to control access. For example, the security subcomponent may facilitate digital rights management (DRM), network intrusion detection, firewall capabilities, and/or the like.

In some embodiments, the security subcomponent may use cryptographic techniques to secure information (e.g., by storing encrypted data), verify message authentication (e.g., via a digital signature), provide integrity checking (e.g., a checksum), and/or the like by facilitating encryption and/or decryption of data. Furthermore, steganographic techniques may be used instead of or in combination with cryptographic techniques. Cryptographic techniques used by the OPP may include symmetric key cryptography using shared keys (e.g., using one or more block ciphers such as triple Data Encryption Standard (DES), Advanced Encryption Standard (AES); stream ciphers such as Rivest Cipher 4 (RC4), Rabbit), asymmetric key cryptography using a public key/private key pair (e.g., using algorithms such as Rivest-Shamir-Adleman (RSA), Digital Signature Algorithm (DSA)), cryptographic hash functions (e.g., using algorithms such as Message-Digest 5 (MD5), Secure Hash Algorithm 2 (SHA-2)), and/or the like. For example, the security subcomponent may comprise a cryptographic system such as Pretty Good Privacy (PGP).

In some implementations, the operating environment component may include a virtualization subcomponent that facilitates OPP virtualization capabilities. In some embodiments, the virtualization subcomponent may provide support for platform virtualization (e.g., via a virtual machine). Platform virtualization types may include full virtualization, partial virtualization, paravirtualization, and/or the like. In some implementations, platform virtualization may be hardware-assisted (e.g., via support from the processor using technologies such as AMD-V, Intel VT-x, and/or the like). In some embodiments, the virtualization subcomponent may provide support for various other virtualized environments such as via operating-system level virtualization, desktop virtualization, workspace virtualization, mobile virtualization, application virtualization, database virtualization, and/or the like. In some embodiments, the virtualization subcomponent may provide support for various virtualized resources such as via memory virtualization, storage virtualization, data virtualization, network virtualization, and/or the like. For example, the virtualization subcomponent may comprise VMware software suite (e.g., VMware Server, VMware Workstation, VMware Player, VMware ESX, VMware ESXi, VMware ThinApp, VMware Infrastructure), Parallels software suite (e.g., Parallels Server, Parallels Workstation, Parallels Desktop, Parallels Mobile, Parallels Virtuozzo Containers), Oracle software suite (e.g., Oracle VM Server for SPARC, Oracle VM Server for x86, Oracle VM VirtualBox, Oracle Solaris 10, Oracle Solaris 11), Informatica Data Services, Wine, and/or the like.

In some embodiments, components 1640 may include a user interface component 1640b. The user interface component may facilitate user interaction with the OPP by providing a user interface. In various implementations, the user interface component may include programmatic instructions to obtain input from and/or provide output to the user via physical controls (e.g., physical buttons, switches, knobs, wheels, dials), textual user interface, audio user interface, GUI, voice recognition, gesture recognition, touch and/or multi-touch user interface, messages, APIs, and/or the like. In some implementations, the user interface component may make use of the user interface elements provided by the operating system subcomponent of the operating environment component. For example, the user interface component may make use of the operating system subcomponent's user interface elements via a widget toolkit. In some implementations, the user interface component may make use of information presentation capabilities provided by the information handling subcomponent of the operating environment component. For example, the user interface component may make use of a web browser to provide a user interface via HTML5, Adobe Flash, Microsoft Silverlight, and/or the like.

In some embodiments, components 1640 may include any of the components PA 1640*c*, IA 1640*d*, HF 1640*e*, HV 1640*f*, SL 1640*g*, SD 1640*h* described in more detail in preceding figures.

Additional embodiment may include:

1. A system for polling, comprising:
   an imaging device;
   a processor configured to analyze images from the imaging device;
   at least one respondent; and
   at least one response device bearing indicia;
   wherein the processor is configured to detect the indicia in images; and
   wherein the at least one respondent manipulates the at least one response device to submit responses to the processor.
2. The system of embodiment 1, wherein the indicia are configured to uniquely identify the at least one respondent among other respondents.
3. The system of embodiment 1, wherein the at least one respondent rotates the at least one response device about an axis substantially parallel to the line of sight from the imaging device to the center the at least one response device to select a desired response.
4. The system of embodiment 1, wherein the indicia are a two-dimensional barcode.
5. The system of embodiment 4, wherein the two-dimensional barcode is substantially square.
6. The system of embodiment 4, wherein the two-dimensional barcode comprises substantially square cells.
7. The system of embodiment 1, wherein the at least one response device is substantially planar.
8. The system of embodiment 7, wherein the response device comprises paper.
9. The system of embodiment 7, wherein the response device comprises reinforced paper.
10. The system of embodiment 7, wherein the response device comprises a plastic.
11. The system of embodiment 7, wherein the response device comprises paper reinforced with a substantially transparent plastic.
12. The system of embodiment 7, wherein the response device comprises reinforced paper.
13. The system of embodiment 1, wherein the at least one response device comprises a rotatably attached member.
14. The system of embodiment 13, wherein the at least one respondent rotates the rotatably attached member to select a desired response.
15. The system of embodiment 3, wherein the at least one respondent chooses the desired response from at least 4 valid responses.
16. The system of embodiment 3, wherein the respondent flips the at least one response device about an axis substantially perpendicular to the line of sight from the imaging device to the center of the at least one response device to select a desired response.
17. The system of embodiment 1, wherein the at least one respondent comprises at least 10 respondents.
18. The system of embodiment 1, wherein the at least one respondent comprises at least 20 respondents.
19. The system of embodiment 1, wherein the at least one respondent comprises at least 30 respondents.
20. The system of embodiment 1, wherein the at least one respondent is at least 15 feet from the imaging device.
21. The system of embodiment 1, wherein the at least one respondent is at least 30 feet from the imaging device.
22. The system of embodiment 4, wherein the two-dimensional barcode comprises a grid of 5 by 5 cells.
23. The system of embodiment 22, wherein the two-dimensional barcode comprises a center cell of a first color.
24. The system of embodiment 23, further comprising:
   a donut of 8 cells of a second color, surrounding the center cell;
   wherein the first color contrasts substantially with the second color.
25. The system of embodiment 1, wherein the at least one respondent chooses a response from among a continuous set of responses by manipulating the at least one response device to an arbitrary position and orientation.
26. The system of embodiment 1, wherein the indicia are computer-readable indicia.
27. The system of embodiment 26, wherein the at least one respondent may submit a desired response without revealing the desired response to other respondents.
28. The system of embodiment 7, wherein the at least one response device is less than 18 inches in length and less than 12 inches in width.
29. The system of embodiment 28, wherein the at least one response device is less than 12 inches in length and less than 9 inches in width.
30. The system of embodiment 29, wherein the at least one response device is less than 9 inches in length.
31. The system of embodiment 1, wherein the processor is configured to display images from the imaging device on an electronic display.
32. The system of embodiment 31, wherein the processor is further configured to augment the images from the imaging device displayed on the electronic display; and wherein the augmented images represent response data gathered by the processor by analyzing the images from the imaging device.
33. A system for providing input to a processor, comprising:
   an imaging device;
   a processor configured to analyze images from the imaging device;
   an input device bearing indicia;
   wherein the processor is configured to detect the indicia in images; and
   wherein input to the processor may be made by manipulating the input device.
34. The system of embodiment 33, wherein the indicia are unique among the indicia of other input devices.
35. The system of embodiment 34, wherein the input device has a pose relative to the imaging device; wherein the processor is configured to substantially determine the pose of the input device relative to the imaging device by analyzing images from the imaging device; and wherein the processor is configured to update an electronic display at least partially based on the pose of the input device.

36. The system of embodiment 35, wherein the input device is substantially planar.

37. The system of embodiment 36, wherein the indicia are a 2-dimensional barcode.

38. The system of embodiment 37, further comprising a plurality of users.

39. The system of embodiment 38, wherein each user of the plurality of users is provided an input device.

40. The system of embodiment 39, wherein the plurality of users comprises at least 10 users.

41. The system of embodiment 39, wherein the plurality of users comprises at least 20 users.

42. The system of embodiment 39, wherein the plurality of users comprises at least 30 users.

43. The system of embodiment 1, wherein the at least one response device is configured to uniquely identify the at least one respondent among other respondents.

44. The system of embodiment 1, wherein the indicia are configured to uniquely identify the at least one response device among other response devices.

45. The system of embodiment 1, wherein the at least one response device is configured to display a response device identifier and a response.

46. The system of embodiment 45, wherein the processor is configured to detect the response device identifier and the response in images from the imaging device.

47. The system of embodiment 46, wherein the processor is provided:
a list of respondents and a list of response device identifiers associated with the list of respondents; and
wherein the processor is configured to associate responses with respondents from the list of respondents, according to the list of response device identifiers.

48. The system of embodiment 47, wherein the processor is configured to record responses associated with respondents in a computer-readable storage medium.

The Embodiments of the OPP

The entirety of this disclosure (including the written description, figures, claims, abstract, appendices, and/or the like) for OPTICAL POLLING PLATFORM METHODS, APPARATUSES AND MEDIA shows various embodiments via which the claimed innovations may be practiced. It is to be understood that these embodiments and the features they describe are a representative sample presented to assist in understanding the claimed innovations, and are not exhaustive and/or exclusive. As such, the various embodiments, implementations, examples, and/or the like are deemed non-limiting throughout this disclosure. Furthermore, alternate undescribed embodiments may be available (e.g., equivalent embodiments). Such alternate embodiments have not been discussed to preserve space and/or reduce repetition. That alternate embodiments have not been discussed is not to be considered a disclaimer of such alternate undescribed embodiments, and no inference should be drawn regarding such alternate undescribed embodiments relative to those discussed in this disclosure. It is to be understood that such alternate undescribed embodiments may be utilized without departing from the spirit and/or scope of the disclosure. For example, the organizational, logical, physical, functional, topological, and/or the like structures of various embodiments may differ. In another example, the organizational, logical, physical, functional, topological, and/or the like structures of the OPP coordinator, OPP coordinator elements, OPP data stores, OPP components and their subcomponents, capabilities, applications, and/or the like described in various embodiments throughout this disclosure are not limited to a fixed operating order and/or arrangement, instead, all equivalent operating orders and/or arrangements are contemplated by this disclosure. In yet another example, the OPP coordinator, OPP coordinator elements, OPP data stores, OPP components and their subcomponents, capabilities, applications, and/or the like described in various embodiments throughout this disclosure are not limited to serial execution, instead, any number and/or configuration of threads, processes, instances, services, servers, clients, nodes, and/or the like that execute in parallel, concurrently, simultaneously, synchronously, asynchronously, and/or the like is contemplated by this disclosure. Furthermore, it is to be understood that some of the features described in this disclosure may be mutually contradictory, incompatible, inapplicable, and/or the like, and are not present simultaneously in the same embodiment. Accordingly, the various embodiments, implementations, examples, and/or the like are not to be considered limitations on the disclosure as defined by the claims or limitations on equivalents to the claims.

This disclosure includes innovations not currently claimed. Applicant reserves all rights in such currently unclaimed innovations including the rights to claim such innovations and to file additional provisional applications, nonprovisional applications, continuation applications, continuation-in-part applications, divisional applications, and/or the like. It is to be understood that while some embodiments of the OPP discussed in this disclosure have been directed to optical polling in a classroom setting, the innovations described in this disclosure may be readily applied to a wide variety of other fields and/or applications.

The following is claimed:

1. A poll administering apparatus, comprising:
a memory;
a processor in communication with the memory, and configured to issue a plurality of processing instructions stored in the memory, wherein the processor issues instructions to:
acquire an image associated with a poll, wherein the image includes a digital representation of a respondent's physical response device bearing a symbol, wherein the physical response device is associated with a plurality of valid orientations, and wherein each of the plurality of valid orientations corresponds to a different response;
find the symbol by analyzing the image;
determine a response specified by the symbol; and
save the response associated with the poll.

2. The apparatus of claim 1, wherein instructions to find the symbol by analyzing the image further comprise instructions to:
locate the symbol in the image; and
decode data specified by the symbol.

3. The apparatus of claim 1, wherein instructions to find the symbol by analyzing the image further comprise instructions to:
find a location of a hole in the image;
validate the hole;
locate a symbol based on the location of the hole; and
decode data specified by the symbol.

4. The apparatus of claim 3, wherein instructions to find the location of the hole in the image further comprise instructions to:
convert the image to a grayscale image;
create an edge image using the grayscale image;
generate an object representation of hole contours using the edge image;

identify a hole contour in the object representation of hole contours;
validate the hole contour; and
establish the location of the hole contour as the location of a hole in the image.

5. The apparatus of claim 3, wherein instructions to validate the hole further comprise instructions to:
locate a donut associated with the hole;
determine a region of interest for the hole;
generate an integral image for the region of interest;
calculate an average brightness for the hole using the integral image;
calculate an average brightness for the donut using the integral image; and
determine whether the average brightness for the hole and the average brightness for the donut satisfy at least one condition.

6. The apparatus of claim 3, wherein instructions to locate the symbol further comprise instructions to:
generate a binarized image for the image;
generate an object representation of contours for the binarized image;
identify an external contour in the object representation of contours;
validate the external contour; and
establish the location of the external contour as the location of a symbol in the image.

7. The apparatus of claim 3, wherein instructions to decode data specified by the symbol further comprise instructions to:
determine an orientation of the symbol; and
determine a data value associated with data cells of the symbol.

8. The apparatus of claim 7, wherein instructions to determine a response specified by the symbol further comprise instructions to:
determine a response based on the orientation of the symbol; and
determine a respondent identifier based on the data value.

9. A poll administering processor-readable non-transitory physical medium storing processor-issuable instructions to:
acquire an image associated with a poll, wherein the image includes a digital representation of a respondent's physical response device bearing a symbol, wherein the physical response device is associated with a plurality of valid orientations, and wherein each of the plurality of valid orientations corresponds to a different response;
find the symbol by analyzing the image;
determine a response specified by the symbol; and
save the response associated with the poll.

10. A processor-implemented poll administering method comprising:
acquiring by a processor an image associated with a poll, wherein the image includes a digital representation of a respondent's physical response device bearing a symbol, wherein the physical response device is associated with a plurality of valid orientations, and wherein each of the plurality of valid orientations corresponds to a different response;
finding by the processor the symbol by analyzing the image;
determining by the processor a response specified by the symbol; and
saving by the processor the response associated with the poll.

11. The method of claim 10, wherein the physical response device bearing a symbol comprises at least one of paper, reinforced paper, plastic.

12. The method of claim 10, wherein the symbol is associated with a plurality of valid orientations, and wherein each of the plurality of valid orientations corresponds to a different response.

13. The method of claim 10, wherein the symbol is a two-dimensional barcode comprised of substantially square cells.

14. The method of claim 10, wherein the processor further issues instructions to determine a respondent identifier of the respondent specified by the symbol.

15. The method of claim 10, wherein the image includes a plurality of digital representations of respondents' physical response devices, and wherein each physical response device is associated with a respondent and bears a unique symbol.

16. The method of claim 10, further comprising synchronizing data regarding the saved response with a server via a network.

17. The method of claim 10, further comprising generating a display signal configured to form the basis for a visual display, wherein the visual display signal includes a representation of results of the poll based on the saved response.

18. The apparatus of claim 1, wherein the processor further issues instructions to calculate a statistic associated with the respondent based on the saved response.

19. The apparatus of claim 1, further comprising a camera, wherein the image is acquired via the camera.

20. The apparatus of claim 19, wherein the camera is embedded in a mobile device.

* * * * *